(12) United States Patent
Sawata

(10) Patent No.: US 12,423,039 B2
(45) Date of Patent: Sep. 23, 2025

(54) WORKFLOW PROCESSING APPARATUS, NON-TRANSITORY COMPUTER READABLE MEDIUM STORING PROGRAM, AND WORKFLOW PROCESSING METHOD

(71) Applicant: FUJIFILM Business Innovation Corp., Tokyo (JP)

(72) Inventor: Naohiro Sawata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 509 days.

(21) Appl. No.: 17/585,506

(22) Filed: Jan. 26, 2022

(65) Prior Publication Data

US 2023/0083806 A1    Mar. 16, 2023

(30) Foreign Application Priority Data

Sep. 10, 2021    (JP) .................................. 2021-147756

(51) Int. Cl.
*G06F 3/12* (2006.01)
*B41C 1/00* (2006.01)

(52) U.S. Cl.
CPC .............. *G06F 3/1275* (2013.01); *B41C 1/00* (2013.01); *G06F 3/1203* (2013.01)

(58) Field of Classification Search
CPC ..... G06F 3/1275; G06F 3/1208; G06F 3/1203
USPC ........................ 358/1.15; 705/7.11, 7.38, 301
See application file for complete search history.

(56) References Cited

U.S. PATENT DOCUMENTS

| | | | |
|---|---|---|---|
| 7,876,465 B2 | 1/2011 | Matsueda | |
| 8,218,173 B2 | 7/2012 | Kuroshima | |
| 2007/0136117 A1* | 6/2007 | Matsueda | G06Q 10/06 |
| | | | 358/1.15 |
| 2014/0297662 A1* | 10/2014 | Wu | G06F 16/245 |
| | | | 707/754 |
| 2017/0003923 A1 | 1/2017 | Hane | |
| 2019/0213040 A1* | 7/2019 | Ohba | G06F 9/526 |
| 2021/0263767 A1* | 8/2021 | Kalluri | G06Q 10/06375 |

FOREIGN PATENT DOCUMENTS

| | | |
|---|---|---|
| JP | 2007164455 | 6/2007 |
| JP | 4810302 | 11/2011 |
| JP | 4940787 | 5/2012 |
| JP | 6368690 | 8/2018 |

OTHER PUBLICATIONS

"Office Action of Japan Counterpart Application", issued on Mar. 25, 2025, with English translation thereof, p. 1-p. 17.

* cited by examiner

*Primary Examiner* — Jamares Q Washington
(74) *Attorney, Agent, or Firm* — JCIPRNET

(57) ABSTRACT

A workflow processing apparatus includes a processor configured to generate, based on a first partial workflow in a workflow in execution, a second partial workflow in which processing executed in the first partial workflow is executed separately from the first partial workflow, the first partial workflow being a part of the workflow within a range designated by a user, and manage processing in a subsequent stage of the first partial workflow and processing in a subsequent stage of the second partial workflow, in one partial workflow.

15 Claims, 18 Drawing Sheets

| ITEM | CONTENT |
| --- | --- |
| SCHEDULED PRINTING MACHINE GROUP NAME | |
| SCHEDULED PRINTING MACHINE ID | |
| LOGICAL PRINTER NAME | |
| PRINTING PROCESS ID | |
| PRINTING PROCESS NAME | |
| NUMBER OF PAGES PER SHEET | |
| NUMBER OF LAYOUTS | |
| NUMBER OF CONTINUATION PAGES | |
| AMOUNT OF PAPER SHEETS | |
| PRINTING SPEED DESIGNATION | |
| ⋮ | ⋮ |
| NUMBER OF COPIES | 200 |
| DEVICE LINK PROFILE NAME | |
| PRINT FILE STORAGE PATH | |
| NUMBER OF DIVISIONS OF PRINT FILE | |
| SCHEDULED START DATE AND TIME | |
| SCHEDULED COMPLETION DATE AND TIME | |
| SCHEDULED REQUIRED TIME | 20 MINUTES |
| START DATE AND TIME | 13:54:04 ON JULY 2, 2021 |
| COMPLETED DATE AND TIME | |
| REQUIRED TIME | |
| ⋮ | ⋮ |

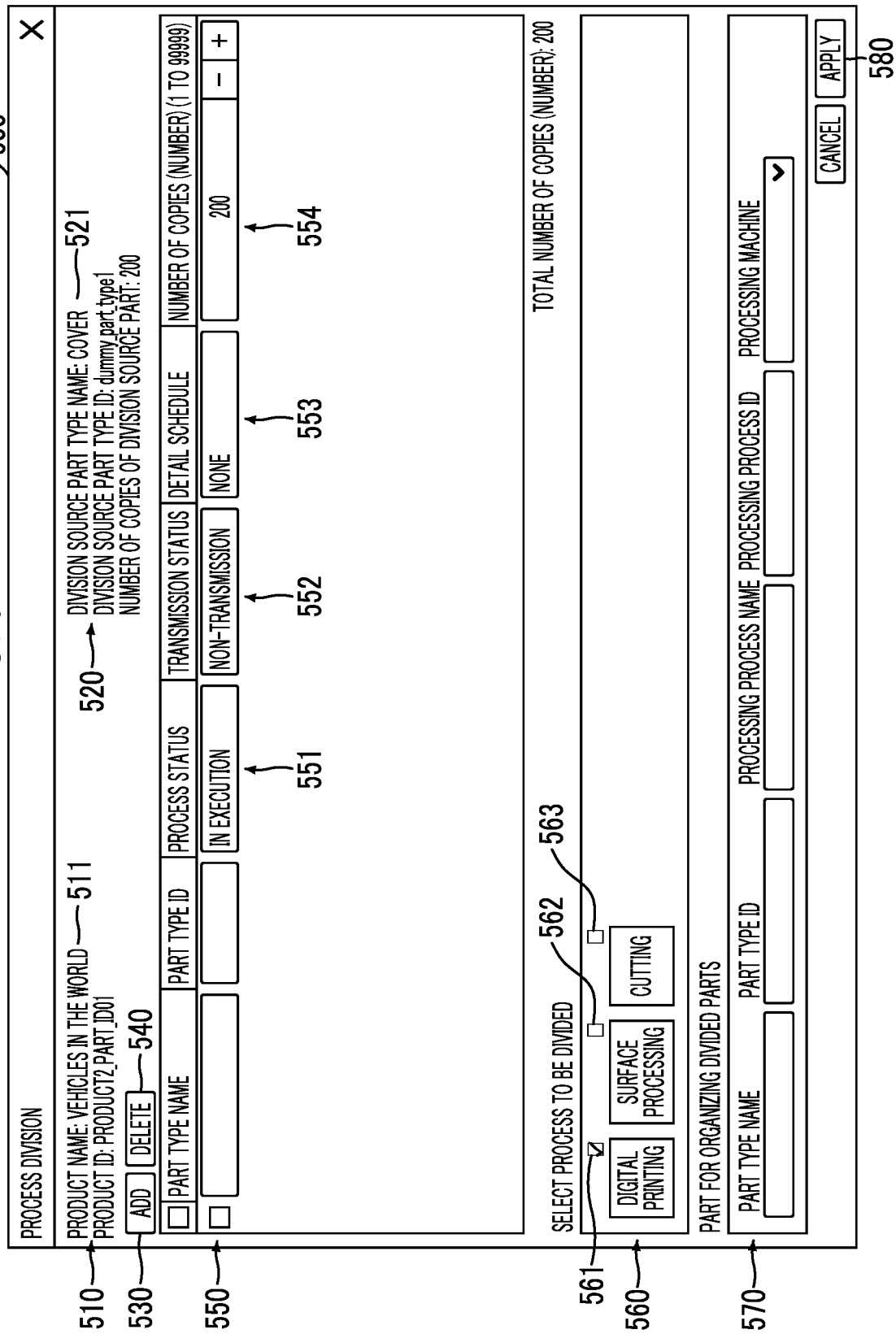

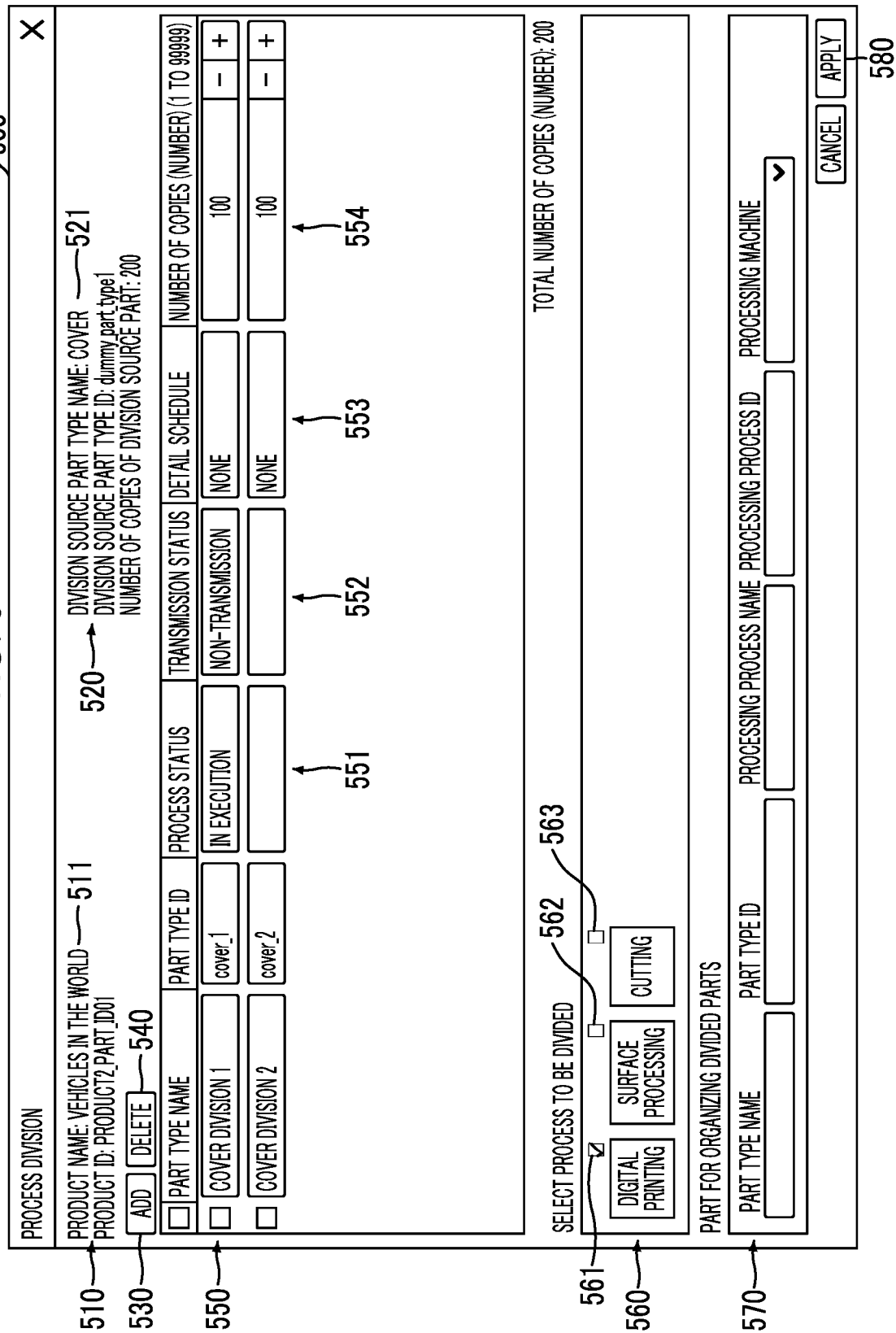

FIG. 10A

| ITEM | CONTENT |
|---|---|
| SCHEDULED PRINTING MACHINE GROUP NAME | |
| SCHEDULED PRINTING MACHINE ID | |
| LOGICAL PRINTER NAME | |
| PRINTING PROCESS ID | |
| PRINTING PROCESS NAME | |
| NUMBER OF PAGES PER SHEET | |
| NUMBER OF LAYOUTS | |
| NUMBER OF CONTINUATION PAGES | |
| AMOUNT OF PAPER SHEETS | |
| PRINTING SPEED DESIGNATION | |
| ... | ... |
| NUMBER OF COPIES | 100 |
| DEVICE LINK PROFILE NAME | |
| PRINT FILE STORAGE PATH | |
| NUMBER OF DIVISIONS OF PRINT FILE | |
| SCHEDULED START DATE AND TIME | |
| SCHEDULED COMPLETION DATE AND TIME | |
| SCHEDULED REQUIRED TIME | 10 MINUTES |
| START DATE AND TIME | 13:54:04 ON JULY 2, 2021 |
| COMPLETED DATE AND TIME | |
| REQUIRED TIME | |
| ... | ... |

FIG. 10B

| ITEM | CONTENT |
|---|---|
| SCHEDULED PRINTING MACHINE GROUP NAME | |
| SCHEDULED PRINTING MACHINE ID | |
| LOGICAL PRINTER NAME | |
| PRINTING PROCESS ID | |
| PRINTING PROCESS NAME | |
| NUMBER OF PAGES PER SHEET | |
| NUMBER OF LAYOUTS | |
| NUMBER OF CONTINUATION PAGES | |
| AMOUNT OF PAPER SHEETS | |
| PRINTING SPEED DESIGNATION | |
| ... | ... |
| NUMBER OF COPIES | 100 |
| DEVICE LINK PROFILE NAME | |
| PRINT FILE STORAGE PATH | |
| NUMBER OF DIVISIONS OF PRINT FILE | |
| SCHEDULED START DATE AND TIME | |
| SCHEDULED COMPLETION DATE AND TIME | |
| SCHEDULED REQUIRED TIME | 20 MINUTES |
| START DATE AND TIME | 14:01:01 ON JULY 2, 2021 |
| COMPLETED DATE AND TIME | |
| REQUIRED TIME | |
| ... | ... |

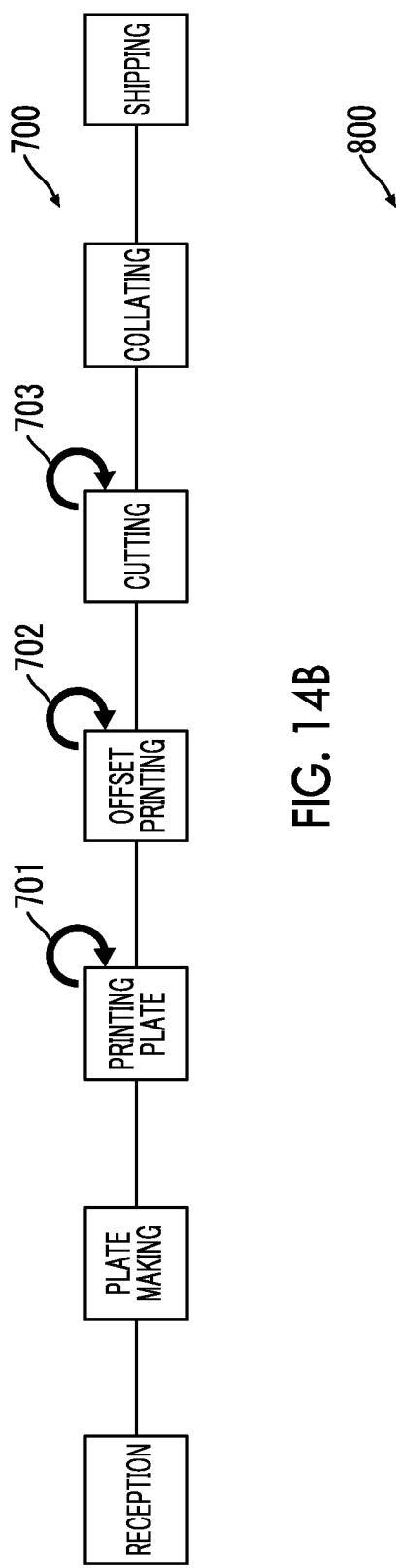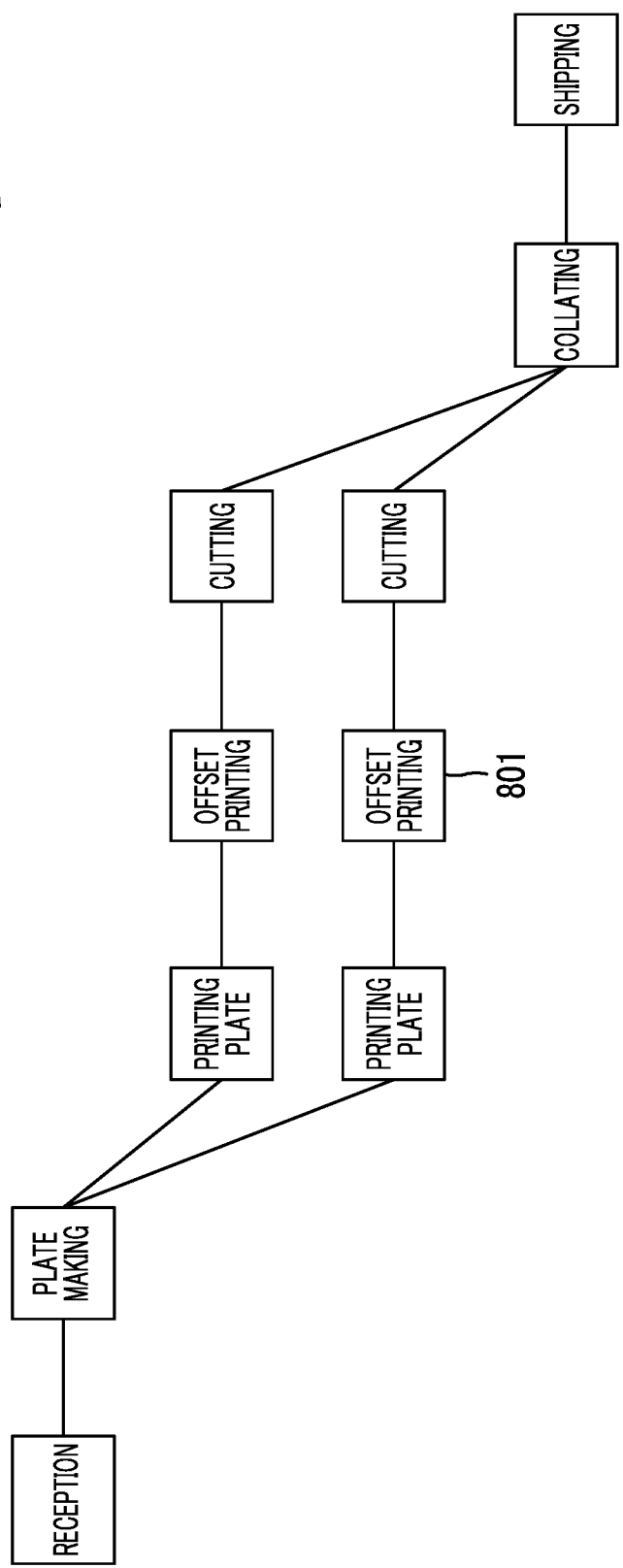

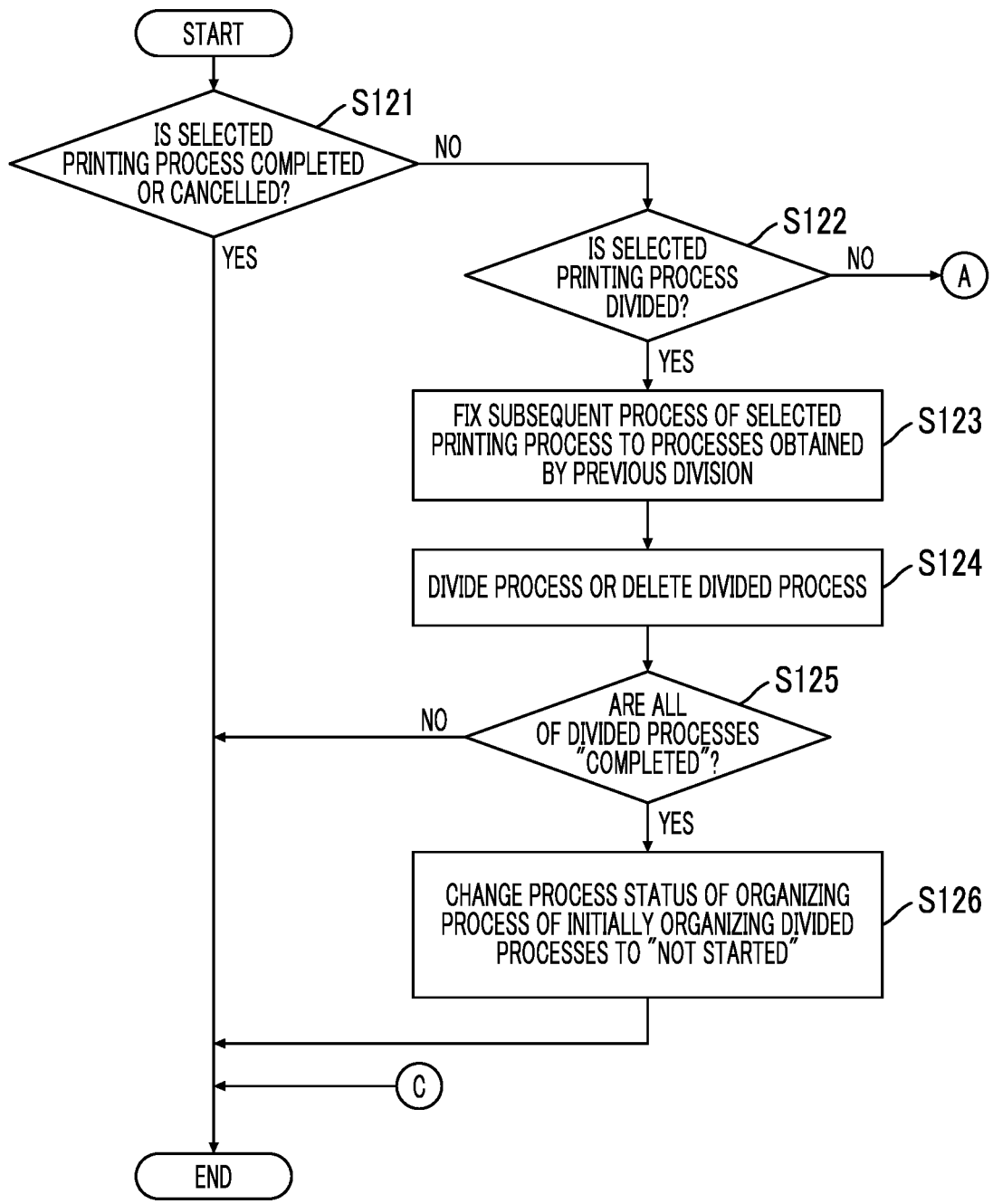

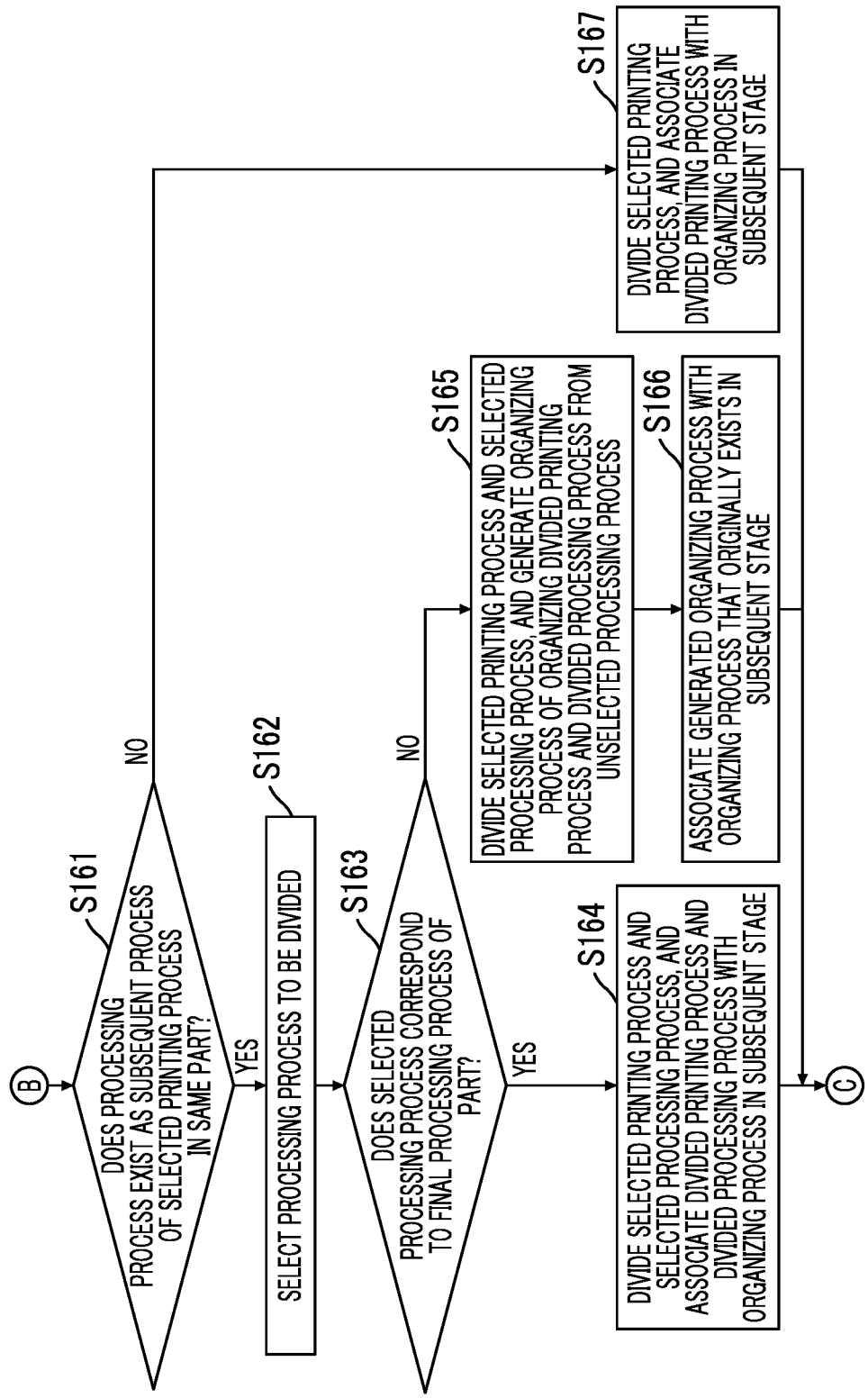

WORKFLOW PROCESSING APPARATUS, NON-TRANSITORY COMPUTER READABLE MEDIUM STORING PROGRAM, AND WORKFLOW PROCESSING METHOD

CROSS-REFERENCE TO RELATED APPLICATIONS

This application is based on and claims priority under 35 USC 119 from Japanese Patent Application No. 2021-147756 filed Sep. 10, 2021.

BACKGROUND

(i) Technical Field

The present invention relates to a workflow processing apparatus, a non-transitory computer readable medium storing a program, and a workflow processing method.

(ii) Related Art

JP4810302B discloses a printing system that produces a final product using a plurality of process apparatuses for executing processing of each process from printing to bookbinding. Each of the process apparatuses receives a combination job in which a plurality of jobs are combined from another process apparatus located in an upstream side of the process apparatus itself, processes the combination job based on job management information indicating processing content of the received combination job, and transmits a notification indicating that processing for each of the plurality of jobs included in the combination job is completed by processing means to a designated notification destination.

JP6368690B discloses a workflow creation support apparatus that acquires job information including information on a plurality of parameters for specifying content of a job, narrows down, from a plurality of registered templates, templates as selection candidates by using information of at least some parameters included in the information on the plurality of parameters, displays information of the narrowed-down templates, creates selection screen data used to display a selection screen for receiving an operation of allowing a user to select one template from the selection candidates, and creates a job definition file based on information of one selected template and the information on the plurality of parameters.

JP4940787B discloses a printing ordering apparatus. In a case where a customer requests a quotation to an ordering site provided by the printing ordering apparatus, the printing ordering apparatus creates a prototype based on quotation conditions and registered process definitions, searches for an actual process for organizing a workflow according to the prototype, sets similar conditions by slightly changing the quotation conditions, searches for processes that meet the similar conditions, creates discount information from the searched processes, organizes a workflow from the searched processes and the created discount information, automatically calculates a quotation from information on the processes of the workflow, presents the quotation and the discount information to the customer, and performs an order for a printed matter on the ordering site in a case where the customer is satisfied with the quotation after examining the quotation.

SUMMARY

A new request for processing managed by a workflow may be requested in an execution of the workflow. In such a case, in a case where the workflow is recreated from the beginning, a burden of a user is increased.

Aspects of non-limiting embodiments of the present disclosure relate to a workflow processing apparatus, a non-transitory computer readable medium storing a program, and a workflow processing method that reduce a burden of a user in a case where a new request for processing managed by a workflow is requested in an execution of the workflow as compared with a configuration in which a workflow is recreated from the beginning.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a workflow processing apparatus including: a processor configured to: generate, based on a first partial workflow in a workflow in execution, a second partial workflow in which processing executed in the first partial workflow is executed separately from the first partial workflow, the first partial workflow being a part of the workflow within a range designated by a user; and manage processing in a subsequent stage of the first partial workflow and processing in a subsequent stage of the second partial workflow, in one partial workflow.

BRIEF DESCRIPTION OF THE DRAWINGS

Exemplary embodiment(s) of the present invention will be described in detail based on the following figures, wherein:

FIG. 4 is a diagram illustrating an example of attribute information of a digital printing process of a cover in the actual data stored by the workflow processing apparatus according to the exemplary embodiment of the present invention;

FIG. 5 is a diagram illustrating an example of a process division screen displayed in the exemplary embodiment of the present invention;

FIG. 6 is a diagram illustrating an example of a process division screen displayed in the exemplary embodiment of the present invention;

FIG. 10A and FIG. 10B are diagrams illustrating an example of attribute information of a digital printing process of a cover division 1 and an example of attribute information of a digital printing process of a cover division 2 in the actual data stored by the workflow processing apparatus according to the exemplary embodiment of the present invention;

FIG. 14A and FIG. 14B are diagrams explaining an operation of dividing a process in actual data based on a division state of a printing plate output;

FIG. 16-1 is a flowchart illustrating an operation example of a workflow management unit in the workflow processing apparatus according to the exemplary embodiment of the present invention;

FIG. 16-2 is a flowchart illustrating an operation example of a workflow management unit in the workflow processing apparatus according to the exemplary embodiment of the present invention; and FIG. 16-3 is a flowchart illustrating an operation example of a workflow management unit in the workflow processing apparatus according to the exemplary embodiment of the present invention.

DETAILED DESCRIPTION

Hereinafter, an exemplary embodiment of the present disclosure will be described in detail with reference to the accompanying drawings.
Outline of Present Exemplary Embodiment According to the present exemplary embodiment, there is provided a workflow processing apparatus that generates, based on a first partial workflow in a workflow in execution, a second partial workflow in which processing executed in the first partial workflow is executed separately from the first partial workflow, the first partial workflow being a part of the workflow within a range designated by a user and manages processing in a subsequent stage of the first partial workflow and processing in a subsequent stage of the second partial workflow, in one partial workflow.

Figure 1:
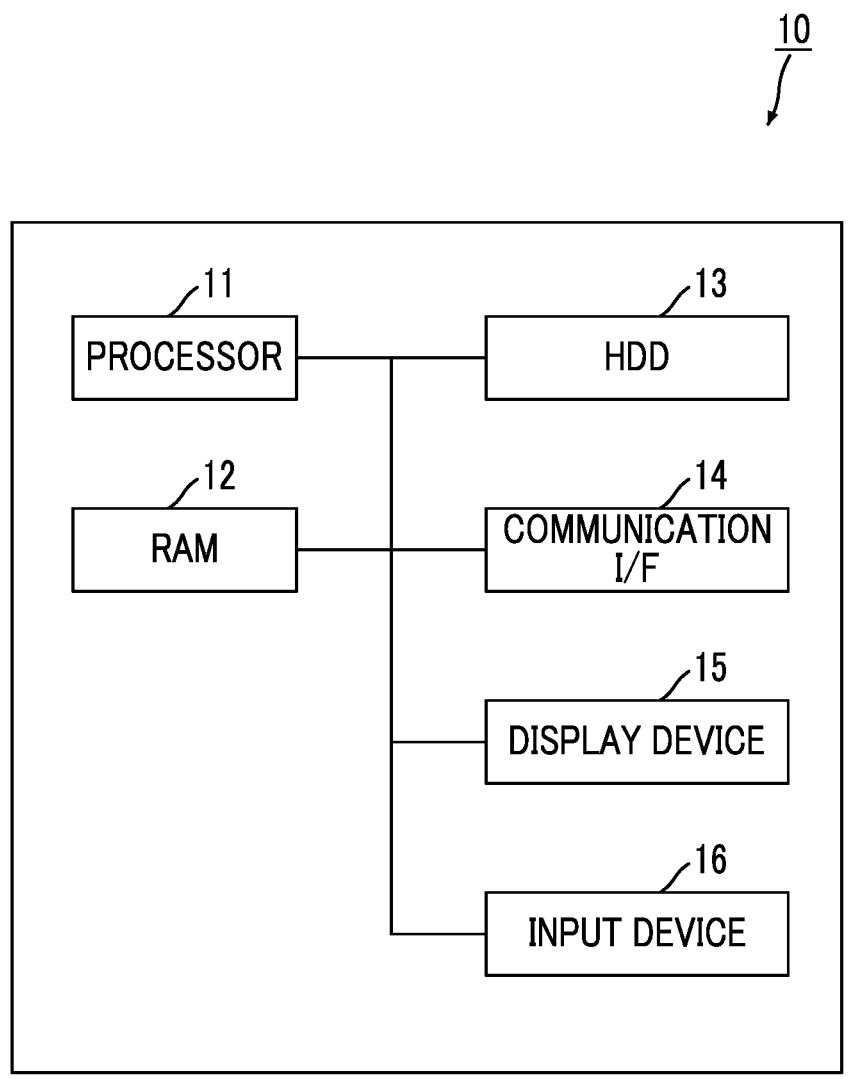
FIG. 1 is a diagram illustrating a hardware configuration example of a workflow processing apparatus according to an exemplary embodiment of the present invention.

Here, the workflow defines a flow of a work including a plurality of processes. There are various types of workflows. In the following, as a workflow, a workflow related to a work of manufacturing a product, particularly a workflow related to a bookbinding work, will be described as an example.
Hardware Configuration of Workflow Processing Apparatus FIG. 1 is a diagram illustrating a hardware configuration example of a workflow processing apparatus 10 according to the present exemplary embodiment. As illustrated in FIG. 1, the workflow processing apparatus 10 includes a processor 11, a random access memory (RAM) 12, a hard disk drive (HDD) 13, a communication interface (hereinafter, referred to as "communication I/F") 14, a display device 15, and an input device 16.

The processor 11 realizes each function to be described by executing various software such as an operating system (OS) and an application program.

The RAM 12 is a memory used as a work memory of the processor 11. The HDD 13 is, for example, a magnetic disk device that stores input data for various software, output data from various software, and the like.

The communication I/F 14 transmits/receives various information to/from another system or another apparatus via a communication line.

The display device 15 is, for example, a display that displays various information. The input device 16 is, for example, a keyboard or a mouse used to receive information from the user.

Specific Example of Present Exemplary Embodiment

Figure 2:
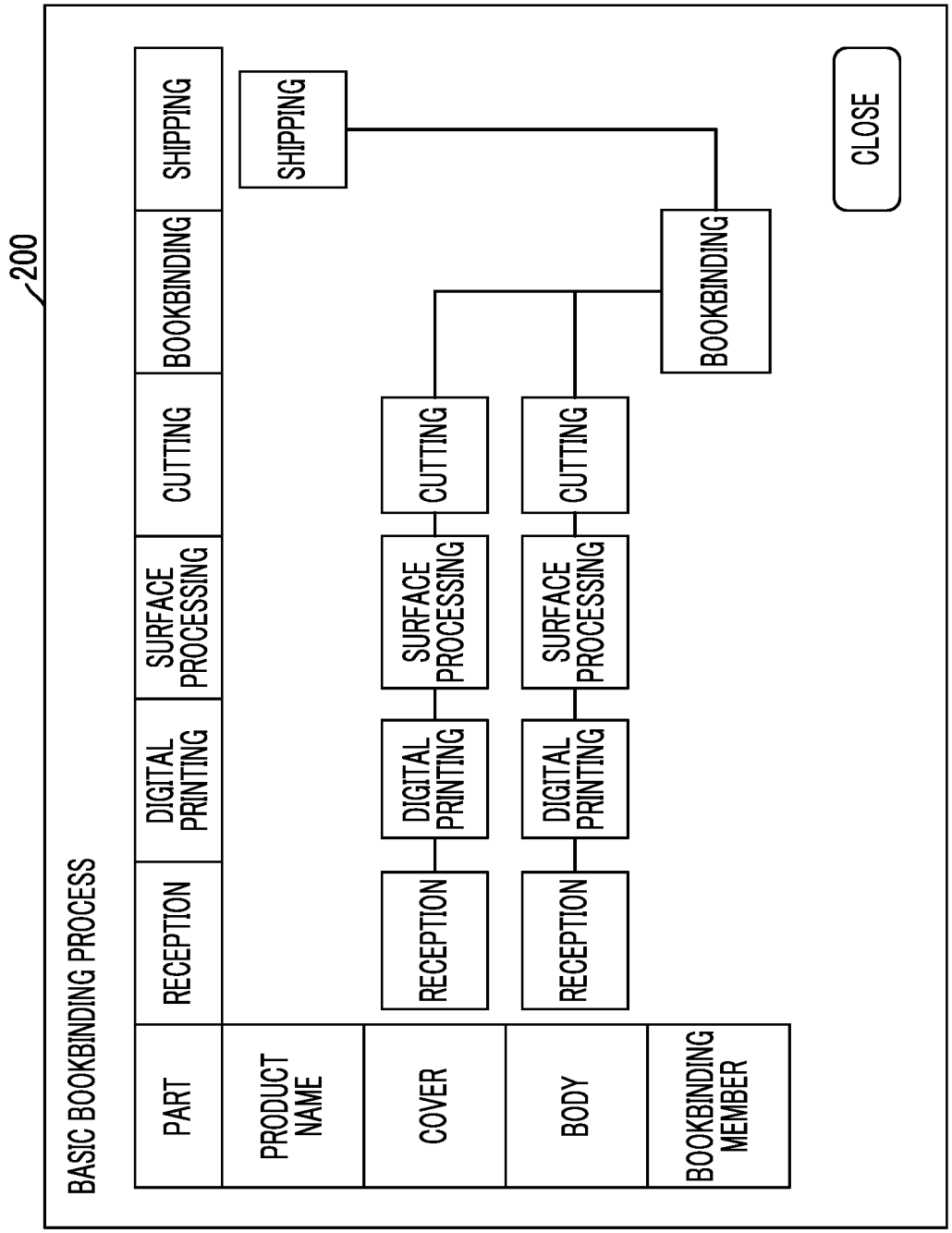
FIG. 2 is a diagram illustrating an example of a workflow template stored by the workflow processing apparatus according to the exemplary embodiment of the present invention.

FIG. 2 is a diagram illustrating an example of a workflow template 200 stored by the workflow processing apparatus 10. The workflow processing apparatus 10 creates a workflow template 200 for a manufacturing material, generates actual data of a workflow defined in the workflow template 200, and manages processes.

As illustrated in FIG. 2, in the workflow template 200, as parts, a product name, a cover, a body, and a bookbinding member are defined. The product name is a name of a product as a manufacturing material. The product name is not strictly apart. In this description, for convenience, the product name is included in parts. In the workflow template 200, a specific product is not assigned yet. For this reason, for the product name, a specific product name is not set. The cover is a cover as a part of the product, and the body is a body as a part of the product. The bookbinding member is a member for binding a cover and a body together.

Further, in the workflow template 200, as processes, a reception process, a digital printing process, a surface processing process, a cutting process, a bookbinding process, and a shipping process are defined. The reception process is a process of receiving digital data. The digital printing process is a process of performing printing based on digital data, the surface processing process is a process of processing a surface of a printed matter, and the cutting process is a process of cutting the printed matter. The bookbinding process is a process of binding the cover and the body together, and the shipping process is a process of shipping a bound product.

FIG. 2 illustrates that the reception process, the digital printing process, the surface processing process, and the cutting process are performed on each of the cover and the body. Further, FIG. 2 illustrates that the cover and the body are bound together in the bookbinding process, and the product in which the cover and the body are bound together is shipped in the shipping process.

Figure 3:
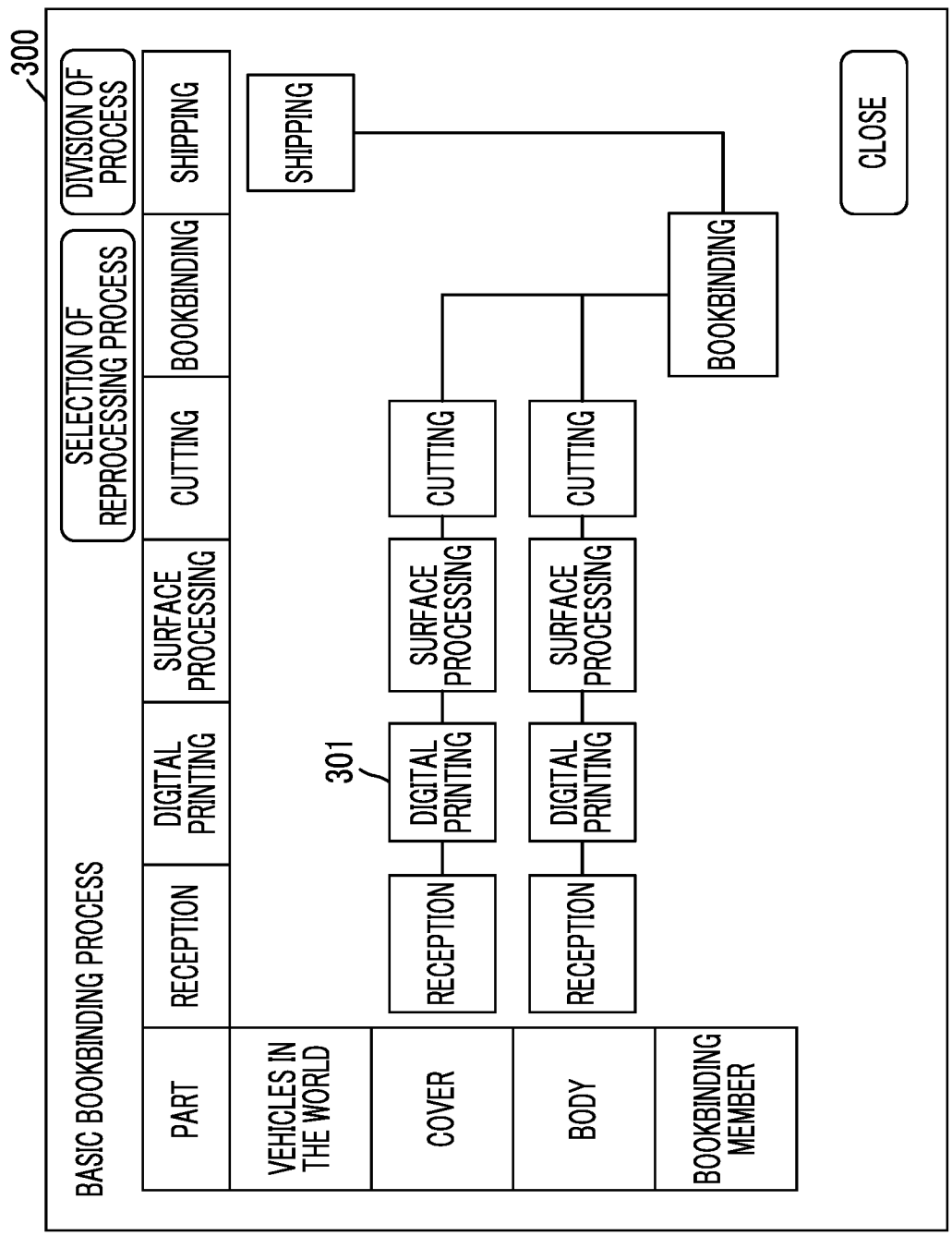
FIG. 3 is a diagram illustrating an example of actual data of a workflow generated by the workflow processing apparatus according to the exemplary embodiment of the present invention.

FIG. 3 is a diagram illustrating an example of actual data 300 of the workflow generated by the workflow processing apparatus 10. The workflow processing apparatus 10 generates the actual data 300 to be managed from the workflow template 200, and performs manufacturing management.

As illustrated in FIG. 3, in the actual data 300, as the product name, "vehicles in the world" as a specific product name is set. Further, the actual data 300 has the same form as the workflow template 200. On the other hand, unlike the workflow template 200, the actual data 300 includes attribute information indicating an attribute of each process of each part.

FIG. 4 is a diagram illustrating an example of attribute information of the digital printing process of the cover in the actual data 300 stored by the workflow processing apparatus 10. For example, the attribute information 400 is displayed by operating an icon 301 (refer to FIG. 3) corresponding to the digital printing process of the cover.

As illustrated in FIG. 4, the attribute information 400 includes, as items, a scheduled printing machine group name, a scheduled printing machine ID, a logical printer name, a printing process ID, a printing process name, the number of imposition pages, the number of layouts, the number of continuation pages, an amount of paper sheets, and a printing speed designation, and the like. The attribute information 400 also includes, as items, the number of copies, a device link profile name, a print file storage path, the number of divisions of the print file, a scheduled start date and time, a scheduled completion date and time, a scheduled required time, a start date and time, a completion date and time, a required time, and the like. In the attribute information 400, the number of copies in the digital printing process is 200 copies, the required time for the digital printing process is 20 minutes, and the start date and time of the digital printing process is 13:54:04 on Jul. 2, 2021.

On the other hand, in a case where the workflow processing apparatus 10 performs a manufacturing management according to the workflow, for example, the following situation may occur.

(1) In manufacture of a manufacturing material, there may be a situation where manufacturing is not completed within a scheduled date and a non-manufactured portion is to be manufactured the next day.

(2) In manufacture of a manufacturing material, there may be a situation where the number of copies of the manufacturing material is increased and all of the manufacturing materials are to be manufactured within a shipping delivery date.

(3) In manufacture of a manufacturing material, there may be a situation where a machine causes a trouble and a non-manufactured portion is to be manufactured by another machine.

(4) In manufacture of a manufacturing material, there may be a situation where a shipping delivery date of the manufacturing material is shortened and the manufacturing material is to be manufactured in parallel.

In a case where such a situation occurs, it is necessary to keep actual results of the manufacturing materials that are already manufactured and increase the number of the manufacturing materials that are to be newly manufactured. Further, in this case, it is also necessary to set a configuration of a subsequent process of the process of increasing the number of the manufacturing materials. That is, it is necessary to select whether to perform a subsequent process for the manufacturing material that is already manufactured and a subsequent process for the manufacturing material that is to be newly manufactured separately or collectively.

For this reason, in the present exemplary embodiment, the workflow processing apparatus 10 divides a workflow process even in a case where the workflow process is already started, and allows a user to recreate a workflow by designating a subsequent process to be further divided.

Specifically, first, in a case where the user selects division from a menu screen displayed by right-clicking the icon 301 of FIG. 3, the workflow processing apparatus 10 displays a process division screen for dividing the process indicated by the icon 301. That is, it is possible to designate and divide a process in progress.

FIG. 5 and FIG. 6 are diagrams illustrating an example of a process division screen 500. Since the icon 301 represents the digital printing process of the cover, the process division screen 500 is a screen for dividing the digital printing process of the cover.

As illustrated in FIG. 5 and FIG. 6, the process division screen 500 includes a product information display area 510 and a part information display area 520. In a product name display field 511 of the product information display area 510, a product name "vehicles in the world" is displayed. In a division source part type name display field 521 of the part information display area 520, "cover" as a part to be divided is displayed.

Further, the process division screen 500 includes an add button 530 and a delete button 540. The add button 530 is a button for adding a part according to division, and the delete button 540 is a button for deleting the added part.

Further, the process division screen 500 includes a part display area 550. Various information included in the attribute information 400 is displayed in the part display area 550. In FIG. 5, "during processing" is displayed as a process status in a process status display field 551, and "non-transmission" is displayed as a transmission status in a transmission status display field 552. In FIG. 4, information on the status is omitted. Further, "none" is displayed as a detail schedule in a detail schedule display field 553. The detail schedule is date and time information indicating a start date and time and an end date and time. Further, "200" is displayed as the number of copies in a number-of-copies display field 554.

On the other hand, in FIG. 5, in a case where the add button 530 is clicked and one is set as the number of parts to be added, the part display area 550 is in a state as illustrated in FIG. 6. In FIG. 5, the number of copies is "200". On the other hand, in FIG. 6, the number of copies of a cover division 1 corresponding to the original part is "100", and the number of copies of a cover division 2 corresponding to the added part is "100".

Further, the process division screen 500 includes a division target process selection area 560. In the division target process selection area 560, a check box 561 for selecting the digital printing process, a check box 562 for selecting the surface processing process, and a check box 563 for selecting the cutting process are displayed. Since FIG. 5 illustrates a screen displayed by operating the icon 301 representing the digital printing process of FIG. 3, a check is already input in the check box 561. Further, in the division target process selection area 560, in a case where a check is input in the check boxes 562 and 563, the surface processing process and the cutting process may be selected, the processes being in a subsequent stage of the digital printing process and being processing processes up to the bookbinding process of organizing a plurality of parts.

Further, the process division screen 500 includes an organizing part designation area 570. The organizing part designation area 570 is an area for designating a part for performing an organizing process to be described.

In this way, it is assumed that the user clicks an apply button 580 in a state where a check is input in the check box 561.

Figure 7:
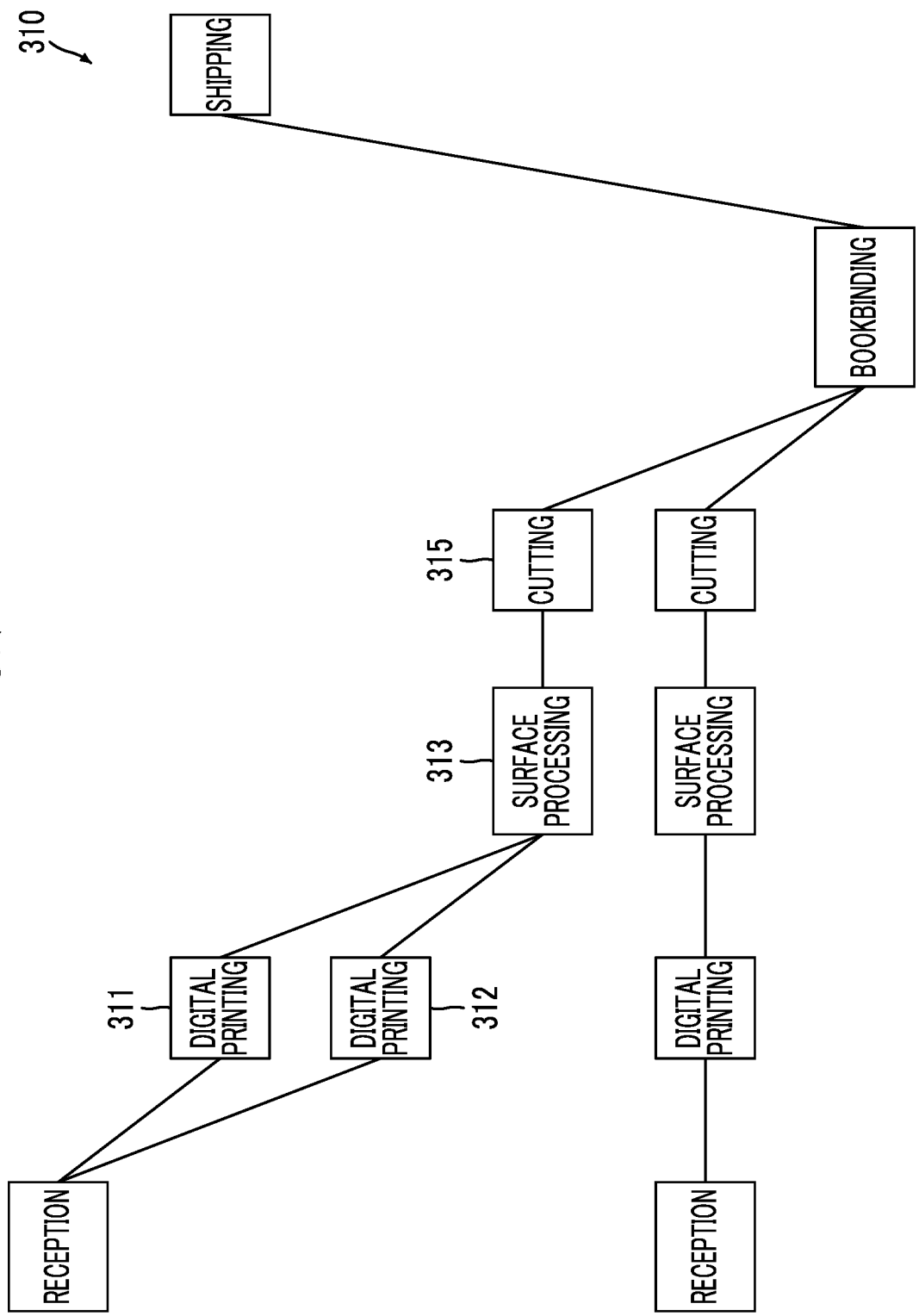
FIG. 7 is a diagram illustrating an example of actual data of a workflow generated by the workflow processing apparatus in a state where a digital printing process is selected in the exemplary embodiment of the present invention.

FIG. 7 is a diagram illustrating an example of actual data 310 of a workflow generated by the workflow processing apparatus 10 in this case. The actual data 310 is actual data obtained by dividing the digital printing process of the cover of the actual data 300 illustrated in FIG. 3. That is, an icon 311 represents a digital printing process of a cover division 1, and an icon 312 represents a digital printing process of a cover division 2. On the other hand, the surface processing process and the cutting process are not divided. Thus, an icon 313 represents a surface processing process of the cover, and an icon 315 represents a cutting process of the cover.

In this case, the digital printing process of the cover division 1 that is represented by the icon 311 is an example of a first partial workflow which is a part of the workflow in a range designated by the user. Further, the digital printing process of the cover division 2 that is represented by the icon 312 is an example of a second partial workflow in which the processing executed in the first partial workflow is executed separately from the first partial workflow.

Further, it is assumed that the user inputs checks in the check box 561 and the check box 562 and clicks the apply button 580 on the process division screen 500 of FIG. 6.

Figure 8:
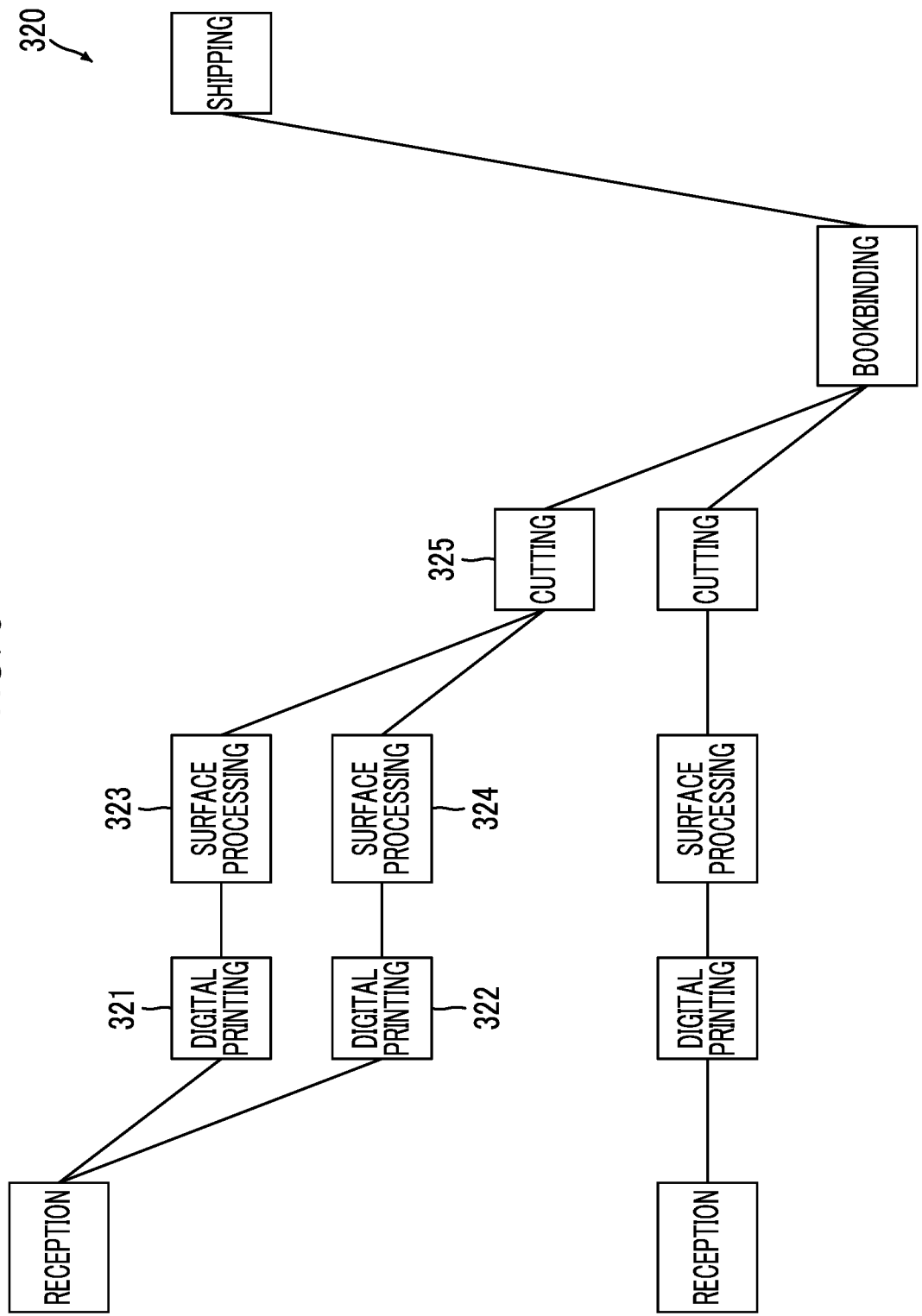
FIG. 8 is a diagram illustrating an example of actual data of a workflow generated by the workflow processing apparatus in a state where a digital printing process and a surface processing process are selected in the exemplary embodiment of the present invention.

FIG. 8 is a diagram illustrating an example of actual data 320 of a workflow generated by the workflow processing apparatus 10 in this case. The actual data 320 is actual data obtained by dividing the digital printing process and the surface processing process of the cover of the actual data 300 illustrated in FIG. 3. That is, an icon 321 represents a digital printing process of a cover division 1, and an icon 322 represents a digital printing process of a cover division 2. Further, an icon 323 represents a surface processing process of the cover division 1, and an icon 324 represents a surface processing process of the cover division 2. On the other hand, the cutting process is not divided. Thus, an icon 325 represents a cutting process of the cover.

In this case, the digital printing process of the cover division 1 that is represented by the icon 321 and the surface processing process of the cover division 1 that is represented by the icon 323 are an example of a first partial workflow which is a part of the workflow in a range designated by the user. Further, the digital printing process of the cover division 2 that is represented by the icon 322 and the surface processing process of the cover division 2 that is represented by the icon 324 are an example of a second partial workflow in which the processing executed in the first partial workflow is executed separately from the first partial workflow.

Further, it is assumed that the user inputs checks in the check box 561 and the check boxes 562 and 563 and clicks the apply button 580 on the process division screen 500 of FIG. 6.

Figure 9:
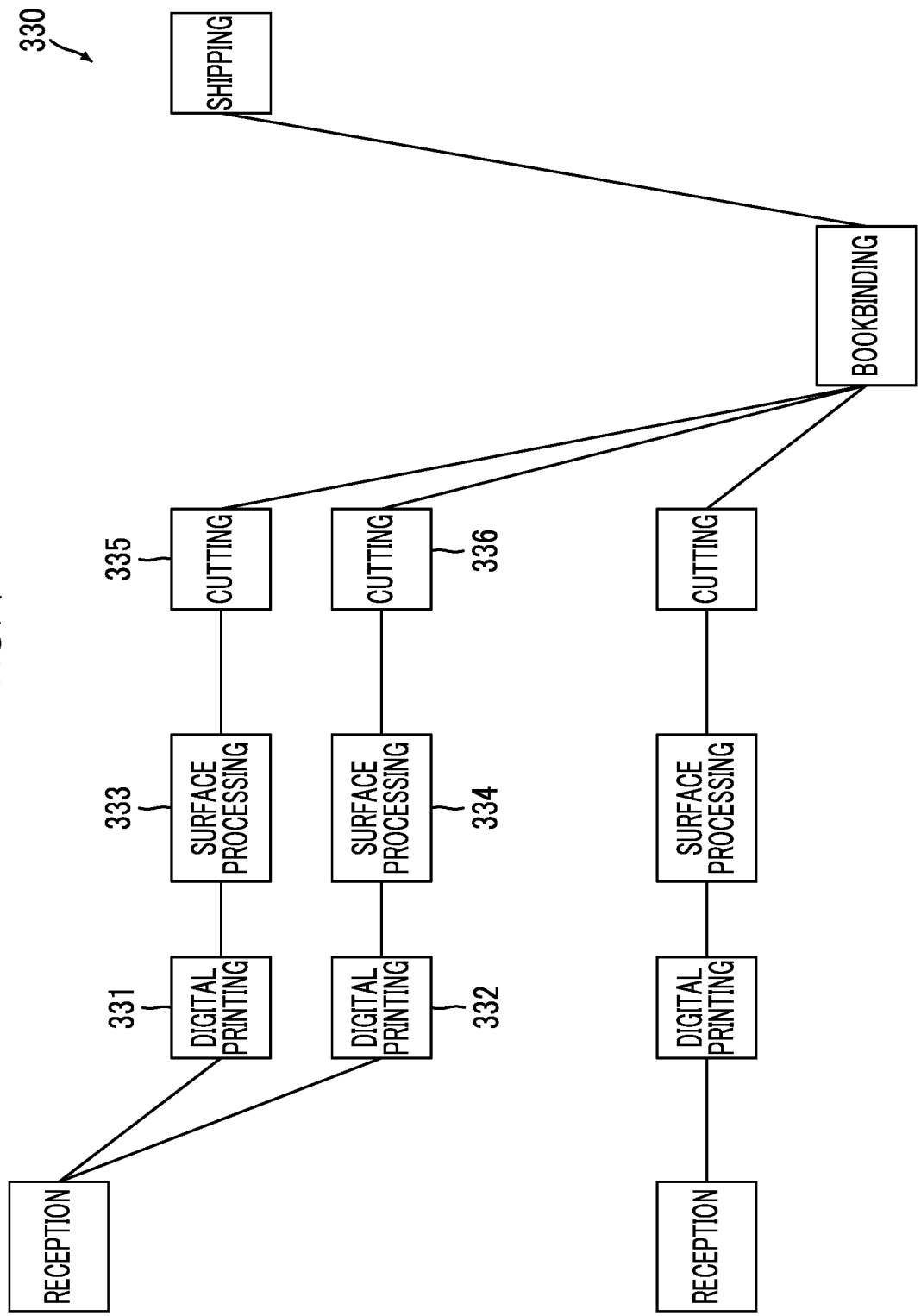
FIG. 9 is a diagram illustrating an example of actual data of a workflow generated by the workflow processing apparatus in a state where a digital printing process, a surface processing process, and a cutting process are selected in the exemplary embodiment of the present invention.

FIG. 9 is a diagram illustrating an example of actual data 330 of a workflow generated by the workflow processing apparatus 10 in this case. The actual data 330 is actual data obtained by dividing the digital printing process, the surface processing process, and the cutting process of the cover of the actual data 300 illustrated in FIG. 3. That is, an icon 331 represents a digital printing process of a cover division 1, and an icon 332 represents a digital printing process of a cover division 2. Further, an icon 333 represents a surface processing process of the cover division 1, and an icon 334 represents a surface processing process of the cover division 2. Further, an icon 335 represents a cutting process of the cover division 1, and an icon 336 represents a cutting process of the cover division 2.

In this case, the digital printing process of the cover division 1 that is represented by the icon 331, the surface processing process of the cover division 1 that is represented by the icon 333, and the cutting process of the cover division 1 that is represented by the icon 335 are an example of a first partial workflow which is a part of the workflow in a range designated by the user. Further, the digital printing process of the cover division 2 that is represented by the icon 332, the surface processing process of the cover division 2 that is represented by the icon 334, and the cutting process of the cover division 2 that is represented by the icon 336 are an example of a second partial workflow in which the processing executed in the first partial workflow is executed separately from the first partial workflow.

In FIG. 7 and FIG. 8, the process of the cover division 1 and the process of the cover division 2 are organized in the processing process of the cover. On the other hand, in FIG. 9, as a subsequent process between the process of the cover division 1 and the process of the cover division 2, an organizing process of organizing only the cover does not exist. In such a case, instead of newly generating an organizing process that organizes the process of the cover division 1 and the process of the cover division 2, in a process that organizes the cover and the body and is represented by an icon 337, the cover division 1, the cover division 2, and the body are organized.

Here, the actual data 310, 320, and 330 also include attribute information indicating an attribute of each process of each part.

FIG. 10A is a diagram illustrating an example of attribute information 411 of the digital printing process of the cover division 1 in the actual data 310 stored by the workflow processing apparatus 10. For example, the attribute information 411 is displayed by operating the icon 311 (refer to FIG. 7) corresponding to the digital printing process of the cover division 1.

FIG. 10B is a diagram illustrating an example of attribute information 412 of the digital printing process of the cover division 2 in the actual data 310 stored by the workflow processing apparatus 10. For example, the attribute information 412 is displayed by operating the icon 312 (refer to FIG. 7) corresponding to the digital printing process of the cover division 2.

In the attribute information 400 of FIG. 4, the number of copies is "200". On the other hand, in the attribute information 411 of FIG. 10A and the attribute information 412 of FIG. 10B, the number of copies is "100". For the number of copies, a value which is set in the part display area 550 of the process division screen 500 of FIG. 6 is set.

Further, in the attribute information 400 of FIG. 4, the scheduled required time is "20 minutes". On the other hand, in the attribute information 411 of FIG. 10A and the attribute information 412 of FIG. 10B, the scheduled required time is "10 minutes". The workflow processing apparatus 10 calculates a scheduled required time based on the number of copies, the scheduled printing machine ID, the number of imposition pages, the number of layouts, the amount of paper sheets, and the printing speed designation.

Further, for the scheduled printing machine group name, the scheduled printing machine ID, the logical printer name, the printing process ID, the printing process name, the number of imposition pages, the number of layouts, the number of continuation pages, the amount of paper sheets, the printing speed designation, the device link profile name, the print file storage path, and the number of divisions of the print file, values before division are copied. In addition, in a case where the process is progressed, for the scheduled start date and time, the scheduled completion date and time, the start date and time, the completion date and time, the required time, and the like, actual results are set. For example, for the scheduled start date and time, the scheduled completion date and time, the start date and time, and the completion date and time, as illustrated in a field of the start date and time, as an example, different values before and after division are set. Here, in FIG. 10A and FIG. 10B, contents for items other than the start date and time are left blank.

In the present exemplary embodiment, as an example of first execution information indicating an execution status of the first partial workflow, the attribute information 400 is used. Further, in the present exemplary embodiment, as an example of second execution information indicating an execution status of the second partial workflow, the attribute information 411 and the attribute information 412 are used.

In the present exemplary embodiment, as an example of first processing amount information indicating an amount of a target to be processed in the first partial workflow, the number of copies in the attribute information 400 is used. Further, in the present exemplary embodiment, as an example of second processing amount information indicating an amount smaller than the amount indicated by the first processing amount information, the number of copies in the attribute information 411 and the number of copies in the attribute information 412 are used.

In the present exemplary embodiment, as an example of first time information indicating a time during which the first partial workflow is executed, the start date and time in the attribute information 400 is used. Further, in the present exemplary embodiment, as an example of second time information indicating a time different from the time indicated by the first time information, the start date and time in the attribute information 411 and the start date and time in the attribute information 412 are used.

Next, a case where an organizing process of organizing the divided processes does not exist will be described. In this case, in a case where the user designates the organizing process in the organizing part designation area 570 of the process division screen 500 of FIG. 6, the workflow processing apparatus 10 generates an organizing process.

First, a division of a process in actual data 610 which includes the reception process, the digital printing process, and the shipping process and does not include the organizing process will be described.

Figure 11A:
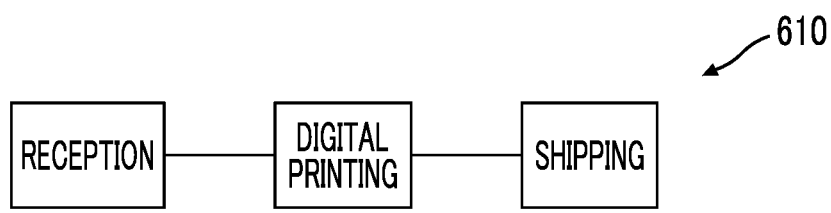
FIG. 11A and FIG. 11B are diagrams explaining a division of a process in actual data which includes a reception process, a digital printing process, and a shipping process and does not include an organizing process.

FIG. 11A is a diagram illustrating actual data 610 before division.

Figure 11B:
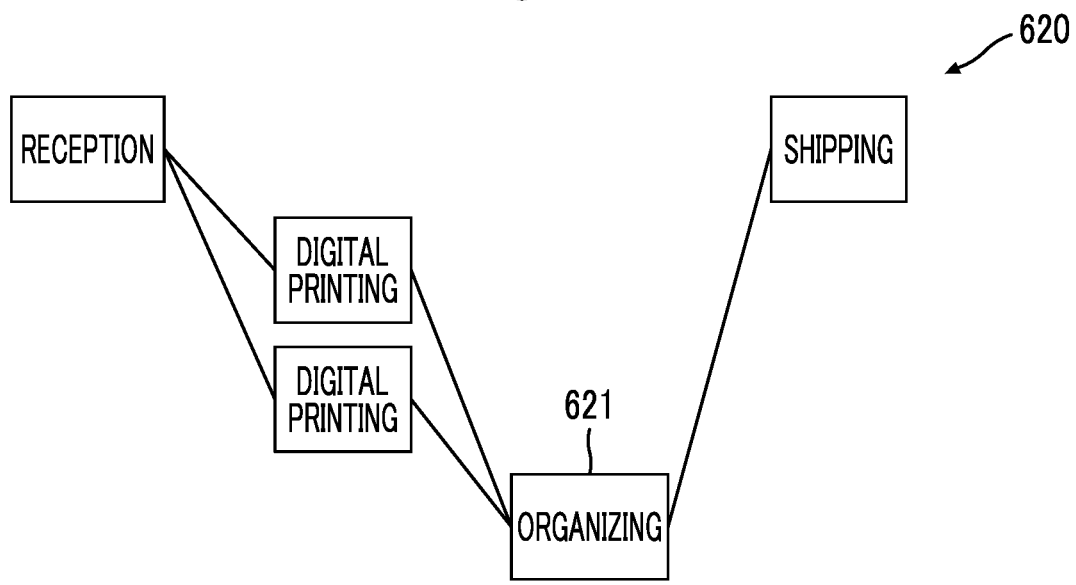

FIG. 11B is a diagram illustrating actual data 620 generated by dividing the digital printing process in the actual data 610. In the actual data 610, an organizing process and a processing process do not exist in a subsequent stage of the digital printing process. Thus, in the actual data 620, the workflow processing apparatus 10 newly generates an organizing process represented by an icon 621.

In this case, the organizing process represented by the icon 621 is an example of an organizing process of organizing the first partial workflow and the second partial workflow, the organizing process being generated in a case where a process of organizing a plurality of partial workflows does not exist in a subsequent stage of the first partial workflow.

Next, a division of a process in actual data 630 which includes the reception process, the digital printing process, the surface processing process, and the shipping process and does not include the organizing process will be described.

Figure 12A:
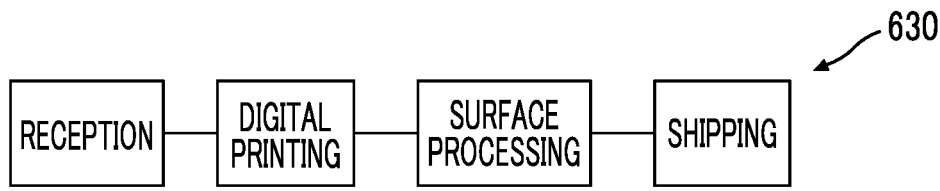
FIG. 12A to FIG. 12C are diagrams explaining a division of a process in actual data which includes a reception process, a digital printing process, a surface processing process, and a shipping process and does not include an organizing process.

FIG. 12A is a diagram illustrating actual data 630 before division.

Figure 12B:
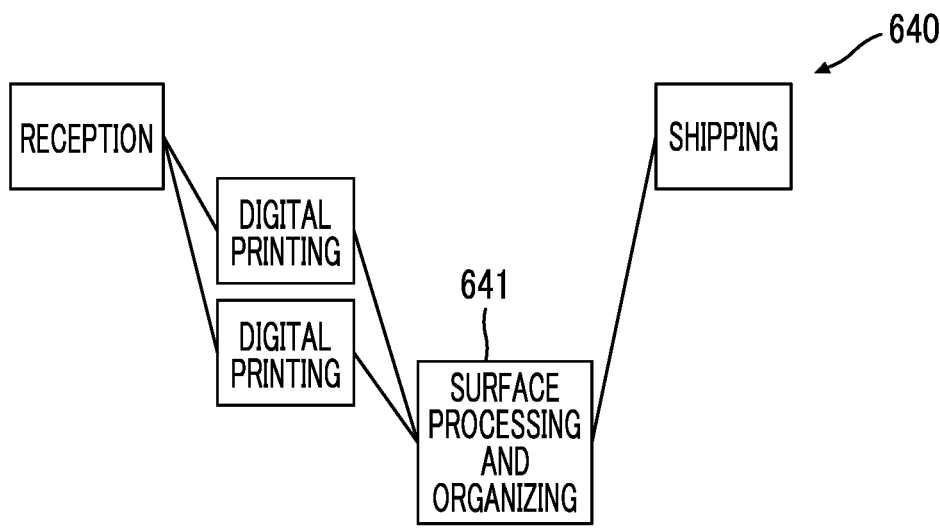

FIG. 12B is a diagram illustrating actual data 640 generated by dividing the digital printing process in the actual data 630. In the actual data 630, in a subsequent stage of the digital printing process, an organizing process does not exist, and a surface processing process as a processing process exists. Thus, in the actual data 640, the workflow processing apparatus 10 allows the surface processing process represented by the icon 641 to also serve as the organizing process.

In this case, the surface processing process that also serves as the organizing process and is represented by the icon 641 is an example of the organizing process that also serves as the processing process and is generated in a case where the processing process exists in a subsequent stage of the first partial workflow.

Figure 12C:
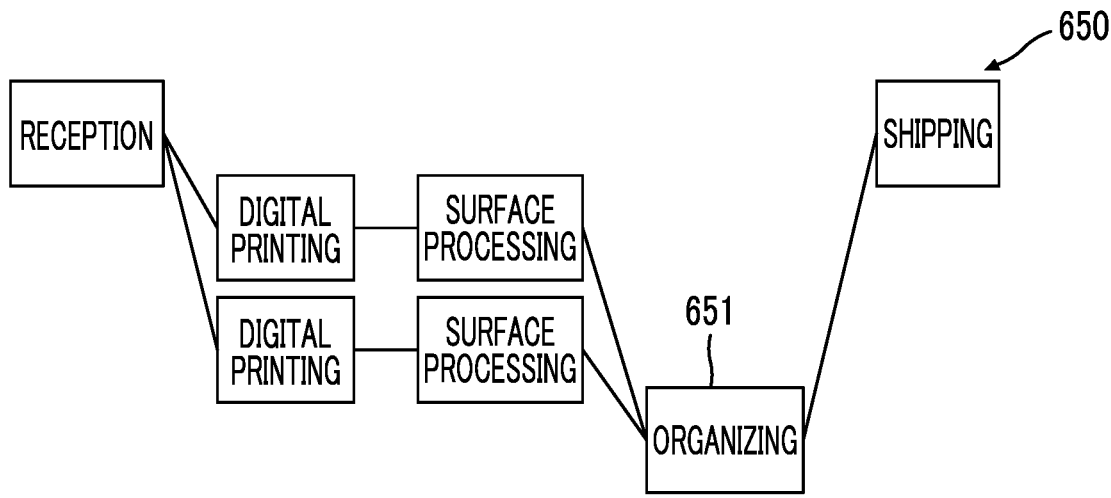

FIG. 12C is a diagram illustrating actual data 650 generated by dividing the digital printing process and the surface processing process in the actual data 630. In the actual data 630, an organizing process and a processing process do not exist in a subsequent stage of the surface processing process. Thus, in the actual data 650, the workflow processing apparatus 10 newly generates an organizing process represented by an icon 651.

In this case, the organizing process represented by the icon 651 is an example of an organizing process of organizing the first partial workflow and the second partial workflow, the organizing process being generated in a case where a process of organizing a plurality of partial workflows does not exist in a subsequent stage of the first partial workflow.

In the present exemplary embodiment, it is assumed that the actual data 650 of FIG. 12C is not generated by dividing the process in the actual data 640 of FIG. 12B.

Next, a division of a process in actual data 660 which includes the reception process, the digital printing process, the surface processing process, the cutting process, and the shipping process and does not include the organizing process will be described.

Figure 13A:
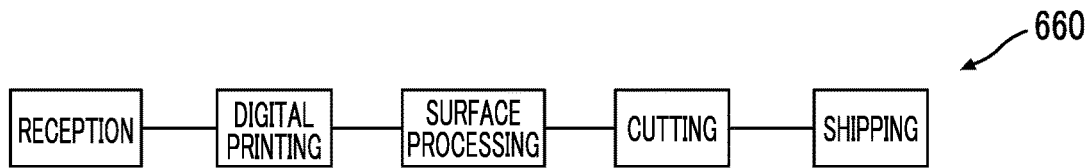
FIG. 13A to FIG. 13D are diagrams explaining a division of a process in actual data which includes a reception process, a digital printing process, a surface processing process, a cutting process, and a shipping process and does not include an organizing process.

FIG. 13A is a diagram illustrating actual data 660 before division.

Figure 13B:
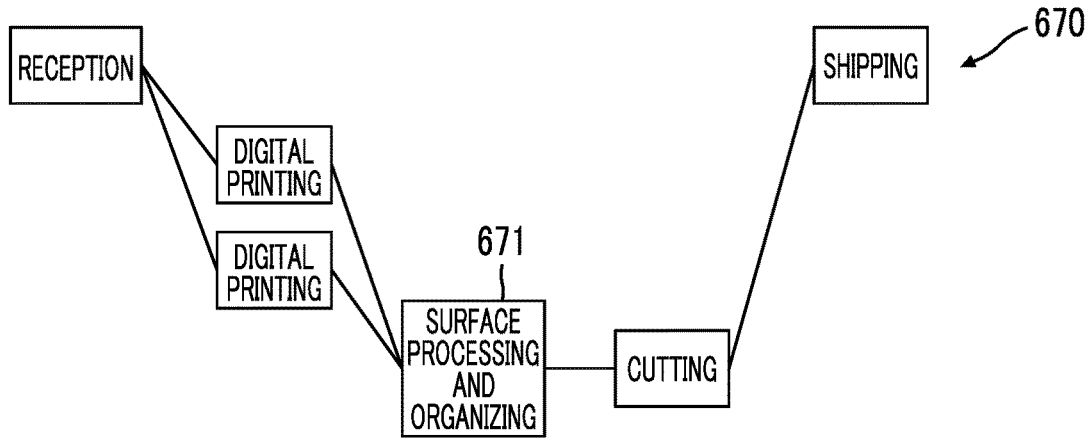

FIG. 13B is a diagram illustrating actual data 670 generated by dividing the digital printing process in the actual data 660. In the actual data 660, in a subsequent stage of the digital printing process, an organizing process does not exist, and a surface processing process as a processing process exists. Thus, in the actual data 670, the workflow processing apparatus 10 allows the surface processing process represented by the icon 671 to also serve as the organizing process.

In this case, the surface processing process that also serves as the organizing process and is represented by the icon 671 is an example of the organizing process that also serves as the processing process and is generated in a case where the processing process exists in a subsequent stage of the first partial workflow.

Figure 13C:
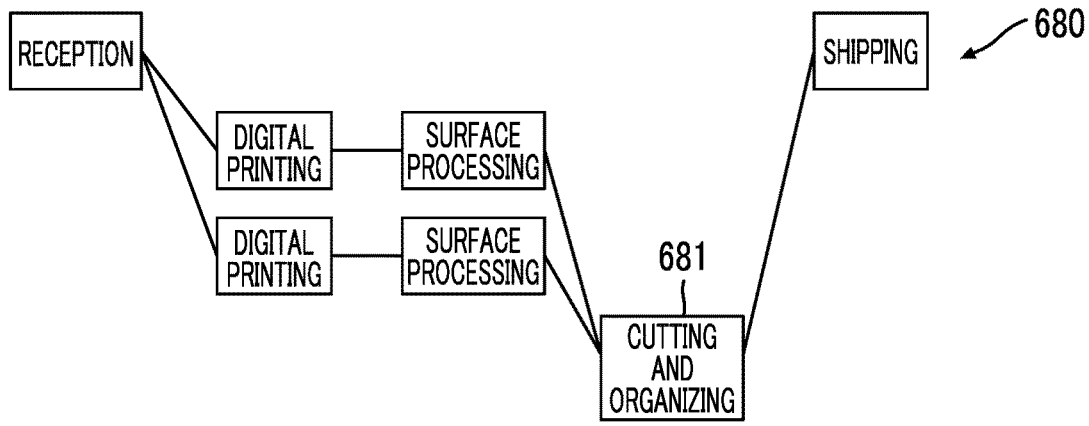

FIG. 13C is a diagram illustrating actual data 680 generated by dividing the digital printing process and the surface processing process in the actual data 660. In the actual data 660, in a subsequent stage of the surface processing process, an organizing process does not exist, and a cutting process as a processing process exists. Thus, in the actual data 680, the workflow processing apparatus 10 allows the cutting process represented by the icon 681 to also serve as the organizing process.

In this case, the cutting process that also serves as the organizing process and is represented by the icon 681 is an example of the organizing process that also serves as the processing process and is generated in a case where the processing process exists in a subsequent stage of the first partial workflow.

Figure 13D:
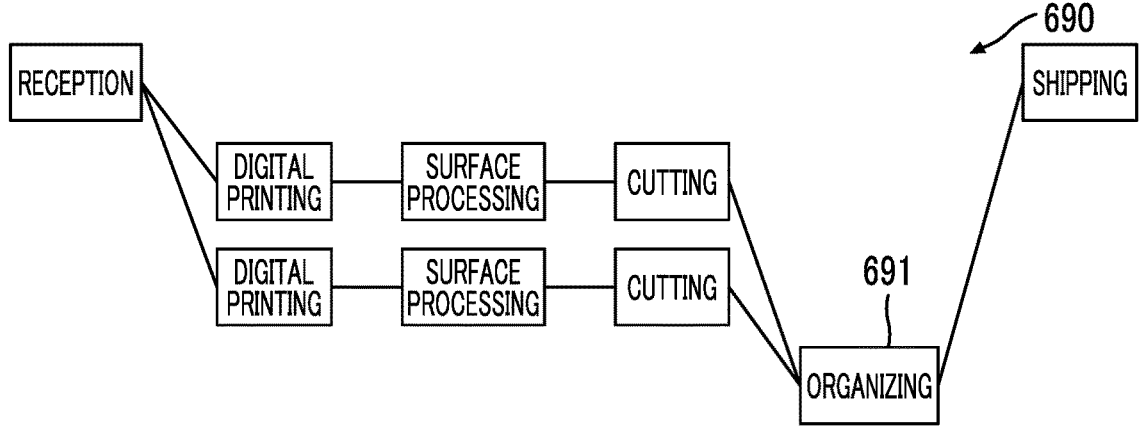

FIG. 13D is a diagram illustrating actual data 690 generated by dividing the digital printing process, the surface processing process, and the cutting process in the actual data 660. In the actual data 660, an organizing process and a processing process do not exist in a subsequent stage of the cutting process. Thus, in the actual data 690, the workflow processing apparatus 10 newly generates an organizing process represented by an icon 691.

In this case, the organizing process represented by the icon 691 is an example of an organizing process of organizing the first partial workflow and the second partial workflow, the organizing process being generated in a case where a process of organizing a plurality of partial workflows does not exist in a subsequent stage of the first partial workflow.

In the present exemplary embodiment, it is assumed that the actual data 680 of FIG. 13C or the actual data 690 of FIG. 13D is not generated by dividing the process in the actual data 670 of FIG. 13B. Further, it is also assumed that the actual data 690 of FIG. 13D is not generated by dividing the process in the actual data 680 of FIG. 13C.

Next, an operation of dividing a process in actual data based on a division state of a printing plate output will be described.

FIG. 14A is a diagram illustrating an example of a workflow template 700 that is a source of actual data on which a division is to be performed. The workflow processing apparatus 10 stores the workflow template 700. The workflow template 700 includes a reception process, a plate making process, a printing plate process, an offset printing process, a cutting process, a collating process, and a shipping process. The workflow template 700 defines a process to be divided by a user. Here, marks 701, 702, and 703 indicate that the user defines the printing plate process, the offset printing process, and the cutting process as a process to be divided.

FIG. 14B is a diagram illustrating an example of actual data 800 generated from the workflow template 700. The workflow processing apparatus 10 generates the actual data 800. Here, it is assumed that two silver plates are created in a plate making process. Even in a case where the user does not designate a process of dividing the actual data 800, the workflow processing apparatus 10 divides the printing plate process, the offset printing process, and the cutting process in the actual data 800 into two. The division may be performed even in a case where the process is progressed. The number of divisions may be changed before the process is progressed.

An operation in a case where the offset printing process represented by, for example, an icon 801 of the actual data 800 of FIG. 14B is divided is the same as the operation described above.

In the present exemplary embodiment, it is assumed that the workflow includes the printing plate process and the number of divisions in the printing plate process is determined according to the number of silver plates as an example of a printing plate, the number of silver plates being determined based on the number of print images and the number of imposition pages in the plate making process which is a previous process of the printing plate process. On the other hand, the present disclosure is not limited to the present exemplary embodiment. The number of divisions of a certain process may be determined according to a processing result of a previous process of the process. In this meaning, the number of silver plates is an example of a processing result.

Functional Configuration of Workflow Processing Apparatus

Figure 15:
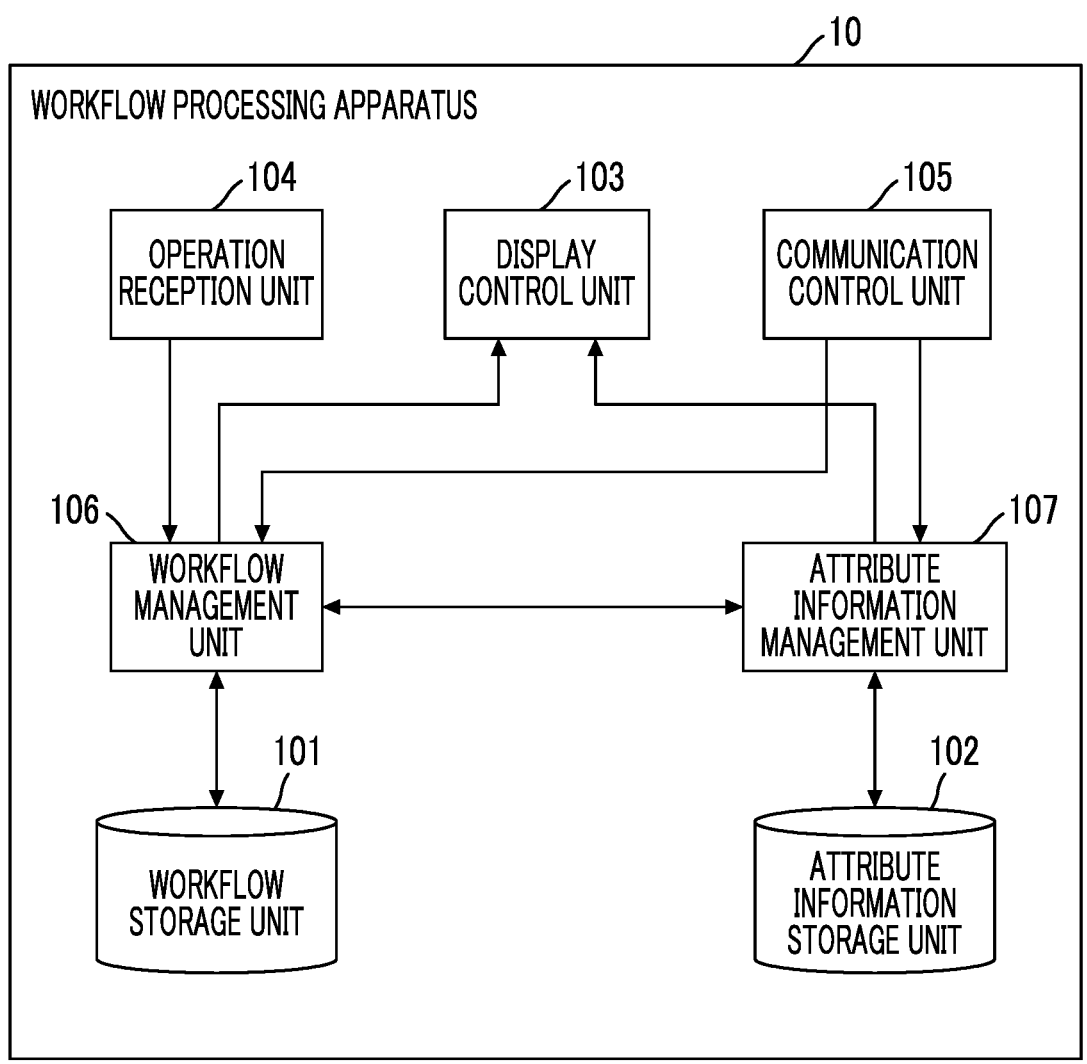
FIG. 15 is a block diagram illustrating a functional configuration example of the workflow processing apparatus according to the exemplary embodiment of the present invention.

FIG. 15 is a block diagram illustrating a functional configuration example of the workflow processing apparatus 10 according to the present exemplary embodiment. As illustrated in FIG. 15, the workflow processing apparatus 10 includes a workflow storage unit 101, an attribute information storage unit 102, a display control unit 103, an operation reception unit 104, a communication control unit 105, a workflow management unit 106, and an attribute information management unit 107.

The workflow storage unit 101 stores actual data of a workflow generated from a workflow template.

The attribute information storage unit 102 stores attribute information indicating an attribute of each process of each part included in the actual data of the workflow that is stored in the workflow storage unit 101.

The display control unit 103 outputs information to the display device 15, and performs a control such that the information is displayed on the display device 15. The display control unit 103 performs a control, for example, such that the workflow transmitted from the workflow management unit 106 or the attribute information transmitted from the attribute information storage unit 102 is displayed on the display device 15. Here, the display control unit 103 outputs the information to the display device 15 of the workflow processing apparatus 10. On the other hand, the information may be output to a display device of a client computer connected to the workflow processing apparatus 10 via a communication line.

The operation reception unit 104 receives a user operation performed by using the input device 16, and acquires user operation information. The operation reception unit 104 receives, for example, a user operation for selecting a process in the workflow, and transmits process selection information to the workflow management unit 106. Here, the operation reception unit 104 acquires the operation information from the input device 16 of the workflow processing apparatus 10. On the other hand, the operation information may be acquired from an input device of a client computer connected to the workflow processing apparatus 10 via a communication line.

The communication control unit 105 controls the communication I/F 14 so as to perform information communication with another system or another apparatus. Here, another system includes an order receiving system, a prepress system, a computer to plate (CTP) system, and the like. In this case, the communication control unit 105 receives, for example, order information from the order receiving system, or receives a processing completion notification from the prepress system or the CTP system. Further, another apparatus includes a printing apparatus, a processing machine, and the like. In this case, the communication control unit 105 receives, for example, a processing completion notification from the printing apparatus or the processing machine.

In a case where the communication control unit 105 receives order information from the order receiving system, the workflow management unit 106 generates actual data of the workflow based on the order information and the workflow template, and stores the actual data of the workflow in the workflow storage unit 101. The workflow management unit 106 reads out the actual data of the workflow stored in the workflow storage unit 101, and transmits the actual data of the workflow to the display control unit 103. Further, the workflow management unit 106 divides a process in the workflow based on the operation information acquired from the operation reception unit 104.

Specifically, the workflow management unit 106 generates a new process of performing processing in the same order as the process by dividing the process in the workflow within a range designated by the user. In the present exemplary embodiment, the workflow management unit 106 performs processing as an example of processing of generating the second partial workflow based on the first partial workflow of the workflow in execution.

At that time, in a case where the user performs an operation of designating a range in the workflow, for example, the workflow management unit 106 may generate a new process by dividing the process within the range designated by the user. Here, for example, the workflow management unit 106 may acquire information indicating the range designated by the user from the operation reception unit 104. In the present exemplary embodiment, the workflow management unit 106 performs processing as an example of processing of generating the second partial workflow according to the operation of designating the range by the user.

Alternatively, in a case where a processing result of a certain process in the workflow is obtained, the workflow management unit 106 may generate a new process based on the processing result by dividing a process in a subsequent stage of the process. Here, a plate making process is exemplified as a certain process, and the number of silver plates is exemplified as a processing result of the process. Further, a printing plate process is exemplified as a process in a subsequent stage of the process. That is, the workflow management unit 106 may generate new processes for the number of silver plates obtained in the plate making process by dividing the printing plate process. In the present exemplary embodiment, the workflow management unit 106 performs processing as an example of processing of generating the second partial workflow according to a processing result of a process in a previous stage of the first partial workflow. Further, in the present exemplary embodiment, the workflow management unit 106 performs processing as an example of processing of generating the second partial workflow such that the number of printing plates is the same as a sum of the number of the first partial workflow and the number of the second partial workflow.

Further, the workflow management unit 106 may generate two or more new processes of performing processing in the same order as the process by dividing the process in the workflow within a range designated by the user. Here, for example, the workflow management unit 106 may acquire information indicating the range designated by the user and information indicating the number of processes to be added by the division, from the operation reception unit 104. Thereafter, the workflow management unit 106 may delete any one of the two or more new processes added by the division. Here, for example, the workflow management unit 106 may acquire information indicating the process to be deleted by designation of the user, from the operation reception unit 104. In the present exemplary embodiment, the workflow management unit 106 generates a second partial workflow and a third partial workflow based on a first partial workflow, the third partial workflow being a workflow in which the processing executed in the first partial workflow is executed separately from the first partial workflow. Thereafter, according to an instruction of the user, the workflow management unit 106 performs processing as an example of processing of deleting the third partial workflow.

Further, the workflow management unit 106 manages the process in the workflow within the range designated by the user and the new process added by the division, in one workflow in a subsequent stage. In the present exemplary embodiment, the workflow management unit 106 performs processing as an example of processing of managing the process in the subsequent stage of the first partial workflow and the process in the subsequent stage of the second partial workflow, in one partial workflow.

In particular, in a case where an organizing process does not exist in a subsequent stage of the process in the workflow within the range designated by the user, the workflow management unit 106 generates an organizing process for organizing the process within the range designated by the user and the new process added by the division. In this case, in a case where a processing process exists in a subsequent stage of the process in the workflow within the range designated by the user, the workflow management unit 106 generates an organizing process from the processing process. In the present exemplary embodiment, in a case where a process of organizing a plurality of partial workflows does not exist in a subsequent stage of the first partial workflow, the workflow management unit 106 performs processing as an example of processing of generating an organizing process of organizing the first partial workflow and the second partial workflow. Further, in the present exemplary embodiment, in a case where a processing process exists in a subsequent stage of the first partial workflow, the workflow management unit 106 performs processing as an example of processing of generating an organizing process that also serves as the processing process.

Further, in a case where an organizing process exists in a subsequent stage of the process in the workflow within the range designated by the user, the workflow management unit 106 associates the new process added by the division with the organizing process. In this case, in a case where a processing process exists in a subsequent stage of the process in the workflow within the range designated by the user, the workflow management unit 106 generates an organizing process from the processing process, and associates the generated organizing process with the organizing process that originally exists in the subsequent stage. In the present exemplary embodiment, in a case where an existing organizing process of organizing a plurality of partial workflows exists in a subsequent stage of the first partial workflow, the workflow management unit 106 performs processing as an example of processing of associating the second partial workflow with the existing organizing process. Further, in the present exemplary embodiment, in a case where a processing process exists in a subsequent stage of the first partial workflow, the workflow management unit 106 performs processing as an example of processing of generating a new organizing process that organizes the first partial workflow and the second partial workflow and also serves as the processing process and associating the second partial workflow with the existing organizing process via the new organizing process.

In a case where the communication control unit 105 receives a processing completion notification from the pre-press system, the CTP system, the printing apparatus, the processing machine, or the like, the attribute information management unit 107 updates the attribute information of the process that is stored in the attribute information storage unit 102 and corresponds to the system or the apparatus.

Further, in a case where a fact that a new process is generated by dividing the process in the workflow within the range designated by the user is acquired from the workflow management unit 106, the attribute information management unit 107 updates the attribute information of the process within the range designated by the user and the attribute information of the new process added by the division. In the present exemplary embodiment, in a case where the second partial workflow is generated based on the first partial workflow, the attribute information management unit 107 performs processing as an example of processing of generating the second execution information based on the first execution information.

Further, in a case where a fact that any one process of the two or more processes added by the division in the workflow is deleted is acquired from the workflow management unit 106, the attribute information management unit 107 determines whether or not process statuses of all the processes added by the division are "completed". In a case where the process statuses of all the processes are "completed", the attribute information management unit 107 changes a process status of an initial organizing process of organizing the process in the workflow designated by the user and the new process added by the division, to "not started". In the present exemplary embodiment, in a state where the third partial workflow is deleted, in a case where an execution of the first partial workflow and an execution of the second partial workflow are completed, the attribute information management unit 107 performs processing as an example of processing of changing a status of a process in a subsequent stage of the first partial workflow and a status of a process in a subsequent stage of the second partial workflow to a startable status.

Operation of Workflow Management Unit

Figures 2, 16:
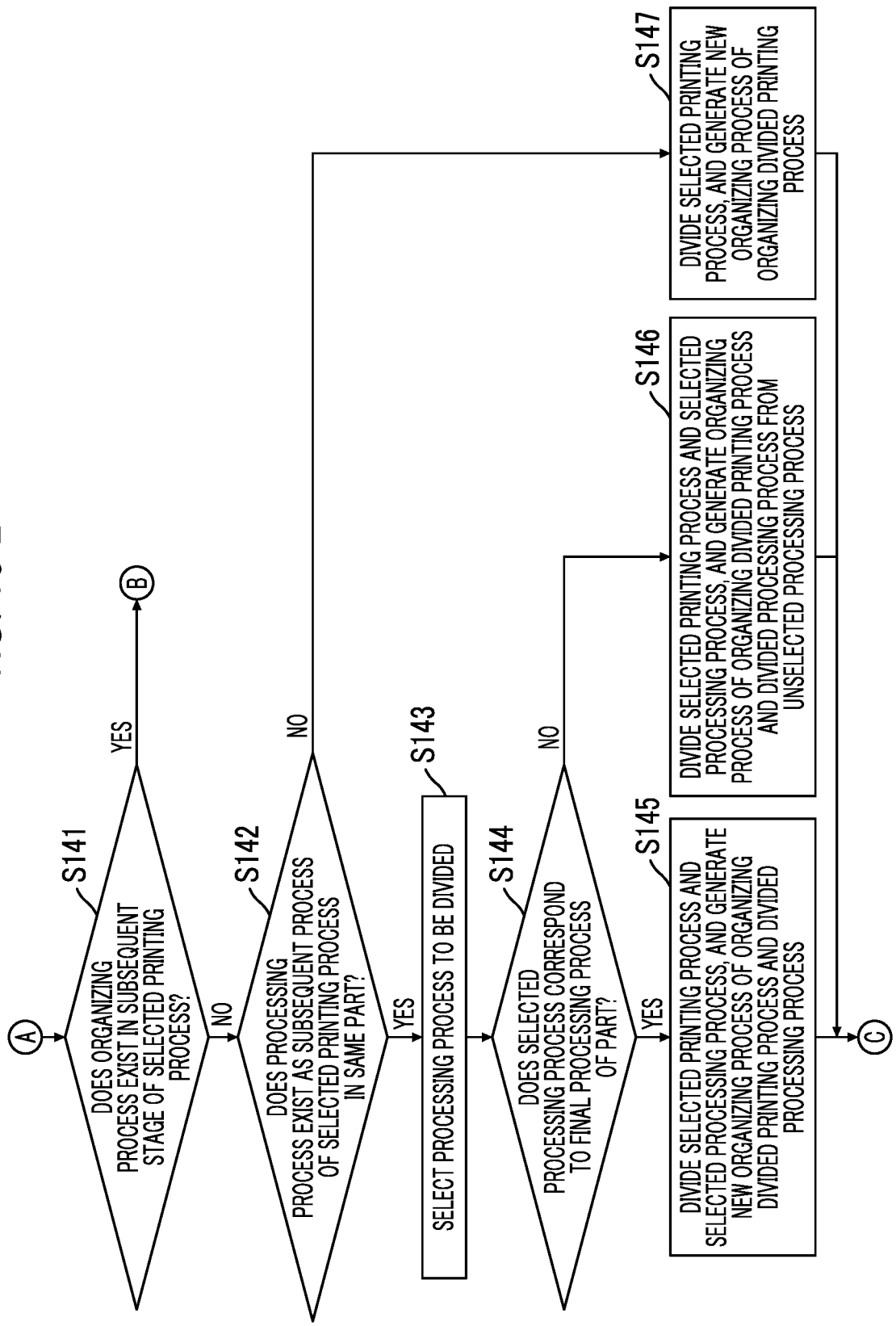

FIG. 16-1 to FIG. 16-3 are flowcharts illustrating an operation example of the workflow management unit 106. Prior to the operation example, it is assumed that the workflow management unit 106 reads out the actual data of the workflow from the workflow storage unit 101 and the display control unit 103 controls the display device 15 to display the workflow. It is assumed that the operation reception unit 104 receives a user operation for the workflow displayed on the display device 15 and transmits information on the user operation to the workflow management unit 106.

As illustrated in FIG. 16-1, first, the workflow management unit 106 determines whether a process status of the selected printing process is "completed" or "cancelled" (step S121).

In a case where it is determined that the process status of the printing process selected in step S121 is "completed" or "cancelled", the printing process is not a target to be divided. Thus, the workflow management unit 106 does not divide the process, and ends the processing.

In a case where it is determined that the process status of the printing process selected in step S121 is neither "completed" nor "cancelled", the workflow management unit 106 determines whether or not the selected printing process is divided (step S122).

In a case where, in step S122, it is determined that the selected printing process is divided, the workflow management unit 106 fixes a subsequent process of the selected printing process to processes obtained by the previous division (step S123). This means that, for example, in a case where the workflow management unit 106 further divides the digital printing process represented by the icon 312 of FIG. 7, the surface processing process represented by the icon 313 and the cutting process represented by the icon 315 are not changed. Alternatively, this means that, for example, in a case where the workflow management unit 106 further divides the digital printing process represented by the icon 322 of FIG. 8, the surface processing process represented by the icon 324 and the cutting process represented by the icon 325 are not changed.

Next, the workflow management unit 106 increases the number of processes by dividing a process, or decreases the number of processes by deleting the divided process (step S124). In this case, the workflow management unit 106 may acquire information on the number of processes to be increased or information on the number of processes to be decreased, from the user operation received by the operation reception unit 104.

Next, in step S124, in a case where the number of divided processes is decreased, the workflow management unit 106 determines whether or not the process statuses of all the divided processes are "completed" (step S125).

In step S125, in a case where it is determined that the process statuses of all the divided processes are "completed", the workflow management unit 106 changes a process status of an organizing process of initially organizing the divided processes to "not started" (step S126). Specifically, the workflow management unit 106 instructs the attribute information management unit 107 to change the process status of the organizing process of initially organizing the divided processes to "not started", and the attribute information management unit 107 changes the process status of the organizing process to "not started".

In step S125, in a case where it is determined that the process status of any of the divided processes is not "completed", the workflow management unit 106 ends the processing without changing the process status of the organizing process to "not started".

In step S122, in a case where it is determined that the selected printing process is not divided, as illustrated in FIG. 16-2, the workflow management unit 106 determines whether or not an organizing process of organizing the divided processes exists in a subsequent stage of the selected printing process (step S141).

In step S141, in a case where it is determined that an organizing process does not exist in a subsequent stage of the selected printing process, the workflow management unit 106 determines whether or not a processing process exists as a subsequent process of the selected printing process in the same part (step S142).

In step S142, in a case where it is determined that a processing process exists as a subsequent process of the selected printing process in the same part, the workflow management unit 106 selects the processing process as a processing process to be divided (step S143). In this step, the workflow management unit 106 may not select the processing process.

Next, the workflow management unit 106 determines whether or not the processing process selected in step S143 is a final processing process of the part (step S144).

In step S144, in a case where it is determined that the selected processing process is a final processing process of the part, the workflow management unit 106 divides the selected printing process and the selected processing process, and generates a new organizing process of organizing the divided printing process and the divided processing process (step S145). For example, the organizing process represented by the icon 651 of FIG. 12C and the organizing process represented by the icon 691 of FIG. 13D correspond to the organizing process generated in this step.

In step S144, in a case where it is determined that the selected processing process is not a final processing process of the part, the workflow management unit 106 divides the selected printing process and the selected processing process, and generates an organizing process of organizing the divided printing process and the divided processing process, from an unselected processing process (step S146). In step S143, even in a case where the processing process is not selected, the workflow management unit 106 sets a determination result in step S144 to "NO" and performs processing of step S146. That is, the workflow management unit 106 divides the selected printing process, and generates an organizing process of organizing the divided printing process, from an unselected processing process. For example, the surface processing process that also serves as the organizing process and is represented by the icon 641 of FIG. 12B, the surface processing process that also serves as the organizing process and is represented by the icon 671 of FIG. 13B, and the cutting process that also serves as the organizing process and is represented by the icon 681 of FIG. 13C correspond to the organizing process generated in this step.

In step S142, in a case where it is determined that a processing process does not exist as a subsequent process of the selected printing process in the same part, the workflow management unit 106 divides the selected printing process, and generates a new organizing process of organizing the divided printing process (step S147). For example, the organizing process represented by the icon 621 of FIG. 11B corresponds to the organizing process generated in this step.

In step S141, in a case where it is determined that an organizing process exists in a subsequent stage of the selected printing process, as illustrated in FIG. 16-3, the workflow management unit 106 determines whether or not a processing process exists as a subsequent process of the selected printing process in the same part (step S161).

In step S161, in a case where it is determined that a processing process exists as a subsequent process of the selected printing process in the same part, the workflow management unit 106 selects the processing process as a processing process to be divided (step S162). In this step, the workflow management unit 106 may not select the processing process.

Next, the workflow management unit 106 determines whether or not the processing process selected in step S162 is a final processing process of the part (step S163).

In step S163, in a case where it is determined that the selected processing process is a final processing process of the part, the workflow management unit 106 divides the selected printing process and the selected processing process, and associates the divided printing process and the divided processing process with an organizing process in a subsequent stage (step S164). For example, the bookbinding process that organizes the cutting processes represented by the icons 335 and 336 of FIG. 9 corresponds to the organizing process associated in this step.

In step S163, in a case where it is determined that the selected processing process is not a final processing process of the part, the workflow management unit 106 divides the selected printing process and the selected processing process, and generates an organizing process of organizing the divided printing process and the divided processing process, from an unselected processing process (step S165). In step S162, even in a case where the processing process is not selected, the workflow management unit 106 sets a determination result in step S163 to "NO" and performs processing of step S165. That is, the workflow management unit 106 divides the selected printing process, and generates an organizing process of organizing the divided printing process, from an unselected processing process. For example, the surface processing process that also serves as the organizing process and is represented by the icon 313 of FIG. 7 and the cutting process that also serves as the organizing process and is represented by the icon 325 of FIG. 8 correspond to the organizing process generated in this step.

Thereafter, the workflow management unit 106 associates the organizing process generated in step S165 with the organizing process that originally exists in the subsequent stage (step S166). In step S162, in a case where the processing process is not selected, the workflow management unit 106 associates the organizing process generated in step S165 with the organizing process or the processing process that originally exists in the subsequent stage.

In step S161, in a case where it is determined that a processing process does not exist as a subsequent process of the selected printing process in the same part, the workflow management unit 106 divides the selected printing process, and associates the divided printing process with the organizing process in the subsequent stage (step S167).

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processing performed by the workflow processing apparatus 10 according to the present exemplary embodiment is prepared as, for example, a program such as application software.

That is, according to the present exemplary embodiment, there is provided a program causing a computer to realize: a function of generating, based on a first partial workflow in a workflow in execution, a second partial workflow in which processing executed in the first partial workflow is executed separately from the first partial workflow, the first partial workflow being a part of the workflow within a range designated by a user; and a function of managing processing in a subsequent stage of the first partial workflow and processing in a subsequent stage of the second partial workflow, in one partial workflow.

Further, a program for realizing the present exemplary embodiment may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A workflow processing apparatus comprising:
a processor configured to:
determine a first partial workflow based on a user operation designating a range from a first process in a workflow in execution to a second process included within a plurality of processes following the first process;
generate, based on the first partial workflow, a second partial workflow in which processing executed in the first partial workflow is executed separately from the first partial workflow, the first partial workflow being a part of the workflow within a range designated by a user, wherein the first partial workflow or the second partial workflow includes one of a reception process, a plate making process, a printing plate process, an offset printing process, a cutting process, a digital printing process, or a surface processing process;
manage processing in a subsequent stage of the first partial workflow and the processing in a subsequent stage of the second partial workflow, in one partial workflow.

2. The workflow processing apparatus according to claim 1,
wherein the processor is configured to generate, based on first execution information indicating an execution status of the first partial workflow, second execution information indicating an execution status of the second partial workflow in a case where the second partial workflow is generated based on the first partial workflow.

3. The workflow processing apparatus according to claim 2,
wherein the first execution information includes first processing amount information indicating an amount of a target to be processed in the first partial workflow, and
the second execution information includes second processing amount information indicating an amount smaller than the amount indicated by the first processing amount information.

4. The workflow processing apparatus according to claim 2,
wherein the first execution information includes first time information indicating a time during which the first partial workflow is executed, and
the second execution information includes second time information indicating a time different from the time indicated by the first time information.

5. The workflow processing apparatus according to claim 1,
wherein the processor is configured to generate the second partial workflow according to an operation of designating the range by the user.

6. The workflow processing apparatus according to claim 1,
wherein the processor is configured to generate the second partial workflow according to a processing result of another process in a previous stage of the first partial workflow.

7. The workflow processing apparatus according to claim 6,
the processing result is the number of printing plates determined based on the number of print images and the number of imposition pages, and
the processor is configured to generate the second partial workflow such that the number of printing plates is the same as a sum of the number of the first partial workflow and the number of the second partial workflow.

8. The workflow processing apparatus according to claim 1,
wherein the processor is configured to generate, based on the first partial workflow, the second partial workflow and a third partial workflow in which processing executed in the first partial workflow is executed separately from the first partial workflow, and delete the third partial workflow according to a user instruction.

9. The workflow processing apparatus according to claim 8,
wherein the processor is configured to change a status of a process in a subsequent stage of the first partial workflow and a status of a process in a subsequent stage of the second partial workflow to a startable status in a case where the third partial workflow is deleted and an execution of the first partial workflow and an execution of the second partial workflow are completed.

10. The workflow processing apparatus according to claim 1,
wherein the processor is configured to generate an organizing process of organizing the first partial workflow and the second partial workflow in a case where a process of organizing a plurality of partial workflows does not exist in a subsequent stage of the first partial workflow.

11. The workflow processing apparatus according to claim 10,
wherein the processor is configured to, in a case where a processing process exists in a subsequent stage of the first partial workflow, generate the organizing process that serves as the processing process.

12. The workflow processing apparatus according to claim 1,
wherein the processor is configured to, in a case where an existing organizing process of organizing a plurality of partial workflows exists in a subsequent stage of the first partial workflow, associate the second partial workflow with the existing organizing process.

13. The workflow processing apparatus according to claim 12,
wherein the processor is configured to, in a case where a processing process exists in a subsequent stage of the first partial workflow, generate a new organizing process that organizes the first partial workflow and the second partial workflow and serves as the processing process, and associate the second partial workflow with the existing organizing process via the new organizing process.

14. A non-transitory computer readable medium storing a program causing a computer to realize:
a function of determining a first partial workflow based on a user operation designating a range from a first process in a workflow in execution to a second process included within a plurality of processes following the first process;
a function of generating, based on the first partial workflow, a second partial workflow in which processing executed in the first partial workflow is executed separately from the first partial workflow, the first partial workflow being a part of the workflow within a range designated by a user, wherein the first partial workflow or the second partial workflow includes one of a reception process, a plate making process, a printing plate process, an offset printing process, a cutting process, a digital printing process, or a surface processing process; and a function of managing processing in a subsequent stage of the first partial workflow and the processing in a subsequent stage of the second partial workflow, in one partial workflow.

15. A workflow processing method comprising:

determining a first partial workflow based on a user operation designating a range from a first process in a workflow in execution to a second process included within a plurality of processes following the first process;

generating, based on the first partial workflow, a second partial workflow in which processing executed in the first partial workflow is executed separately from the first partial workflow, the first partial workflow being a part of the workflow within a range designated by a user, wherein the first partial workflow or the second partial workflow includes one of a reception process, a plate making process, a printing plate process, an offset printing process, a cutting process, a digital printing process, or a surface processing process; and managing processing in a subsequent stage of the first partial workflow and the processing in a subsequent stage of the second partial workflow, in one partial workflow.

* * * * *